(12) United States Patent
Clower et al.

(10) Patent No.: US 10,346,135 B2
(45) Date of Patent: Jul. 9, 2019

(54) INTERNET-ENABLED AUDIO-VISUAL GRAPHING CALCULATOR

(71) Applicant: Desmos, Inc., San Francisco, CA (US)

(72) Inventors: Stephen A. Clower, Fort Wayne, IN (US); Eli A. Luberoff, San Francisco, CA (US); Jennifer M. Wales, San Francisco, CA (US)

(73) Assignee: Desmos, Inc., San Francisco, CA (US)

( * ) Notice: Subject to any disclaimer, the term of this patent is extended or adjusted under 35 U.S.C. 154(b) by 4 days.

(21) Appl. No.: 15/852,688

(22) Filed: Dec. 22, 2017

(65) Prior Publication Data

US 2018/0217816 A1    Aug. 2, 2018

Related U.S. Application Data

(60) Provisional application No. 62/451,552, filed on Jan. 27, 2017.

(51) Int. Cl.
*G06F 3/01* (2006.01)
*G06F 7/57* (2006.01)
(Continued)

(52) U.S. Cl.
CPC ............... *G06F 7/57* (2013.01); *G06F 16/68* (2019.01); *G06F 16/9024* (2019.01);
(Continued)

(58) Field of Classification Search
None
See application file for complete search history.

(56) References Cited

U.S. PATENT DOCUMENTS

| 9,280,524 | B2* | 3/2016 | Smirnova | G06F 17/214 |
| 2008/0253657 | A1* | 10/2008 | Radakovic | G06K 9/00402 |
| | | | | 382/182 |

(Continued)

OTHER PUBLICATIONS

Shelton, R., MathTrax Frequently Asked Questions, National Aeronautics and Space Administration, last updated Apr. 8, 2005, retrieved on Feb. 23, 2018 from https://prime.jsc.nasa.gov/mathtrax/faqPage.html, 2 pages.

(Continued)

*Primary Examiner* — David H Malzahn
(74) *Attorney, Agent, or Firm* — Mauriel Kapouytian Woods LLP; Elaine K. Lee; Michael Mauriel

(57) ABSTRACT

A method of graphically representing mathematical expressions in both audio and visual formats on a user device is described. Embodiments of the present invention include an Internet-enabled audio-visual graphing calculator that receives input from a user device in at least one of at least one of audio, visual, or Braille formats. An embodiment of the present invention interprets input received from the user device as a typeset mathematical expression, parses the typeset mathematical expression into an interpreted mathematical expression and compiles the interpreted mathematical expression into an evaluation function. At least one point is sampled on the evaluation function. The sampled evaluation function is rendered as a graph on a visual display of a user device. In an embodiment of the invention, an audible representation of the rendered graph is generated for playback on the user device.

21 Claims, 26 Drawing Sheets

(51) Int. Cl.
  *G09B 21/00*     (2006.01)
  *G06F 16/95*     (2019.01)
  *G06F 16/901*    (2019.01)
  *G06F 16/68*     (2019.01)
  *G10L 13/08*     (2013.01)

(52) U.S. Cl.
  CPC .......... *G06F 16/95* (2019.01); *G09B 21/007* (2013.01); *G09B 21/008* (2013.01); *G10L 2013/083* (2013.01)

(56) References Cited

U.S. PATENT DOCUMENTS

| | | | | |
|---|---|---|---|---|
| 2012/0042242 | A1* | 2/2012 | Garland | G06F 17/215 715/256 |
| 2014/0006941 | A1* | 1/2014 | Smirnova | G06F 17/214 715/268 |
| 2017/0132484 | A1* | 5/2017 | Malon | G06K 9/344 |
| 2018/0217816 | A1* | 8/2018 | Clower | G06F 7/57 |

OTHER PUBLICATIONS

Miele, J.A., Smith-Kettlewell Display Tools: A Sonification Toolkit for MATLAB, Proceedings of the 2003 International Conference on Auditory Display, Boston, MA, USA, Jul. 6-9, 2003, pp. 288-291.

Shelton, R., MATHTRAX Overview, National Aeronautics and Space Administration, last updated Apr. 13, 2005, retrieved on Feb. 23, 2018 from https://prime.jsc.nasa.gov/mathtrax/INFO/overview.htm, 1 page.

SAS enables visually impaired to 'visualize' data, SAS Institute Inc., Feb. 22, 2017, retrieved on Feb. 23, 2018 from https://www.sas.com/en_us/new/press-releases/2017/february/sas-graphics-accelerator-education.html, 4 pages.

SAS Graphics Accelerator Customer Product Page, SAS Institute Inc., retrieved on Feb. 23, 2018 from http://support.sas.com/software/products/graphics-accelerator/index.html#s 1=1, 1 page.

SAS Graphics Accelerator: User's Guide, SAS Institute Inc., Dec. 2017, Cary, N.C., USA, pp. 1-18.

* cited by examiner

US 10,346,135 B2

INTERNET-ENABLED AUDIO-VISUAL GRAPHING CALCULATOR

RELATED PATENT APPLICATIONS

This application claims priority to U.S. provisional application 62/451,552 titled "Internet-Enabled Audio-Visual Graphing Calculator", filed Jan. 27, 2017. This and all other extrinsic references referenced herein are incorporated by reference in their entirety.

BACKGROUND

The background description includes information that may be useful in understanding the present invention. It is not an admission that any of the information provided herein is prior art or relevant to the presently claimed invention, or that any publication specifically or implicitly referenced is prior art.

Web-based graphing calculator programs for general use that run on a browser and web-based graphing calculator programs optimized for mobile devices such as smartphones and tablets are rapidly increasing in popularity. Such devices are a convenient substitute to carrying a separate specialized graphing calculator (such as the TI-83 Plus or TI-84 Plus or other ubiquitous TI graphing calculators) for students, engineering professionals and others who need to use such a portable device in their daily activities on worksites or in campus classrooms.

Accessibility for visually and hearing-impaired persons to such computing and mathematical applications and devices has long been an area of ongoing research. One challenging research area is finding ways to express graphical output such as curves on a Cartesian, polar or other coordinate system in a comprehensible manner for persons who are blind or low vision. Verbal output systems function well for persons relying on screen reader technology to voice computer activity. A screen reader is software that runs on computer systems which converts text on screen into spoken or Braille output to enable persons who are blind or low vision to operate a computer system. For example, "start fraction, 1 over 2, end fraction" is a reasonable syntax to verbally describe a fraction. However, for following more complex mathematical expressions, verbal output may be more complicated to follow. In addition, hearing and/or visually impaired students who are Braille readers may find verbal output systems inadequate. People who rely on Braille for communication use well-established codes for communicating arithmetic ideas that may be used to adapt calculator functions to Braille input and output devices.

According to the Random House Dictionary, Braille is "a system of writing and printing for the blind in which arrangements of raised dots representing letters and numbers can be identified by touch." Each Braille character, known as a cell, consists of a combination of six or eight dots, The Braille code is used by people who are low vision or totally blind to read and write, typically with manual writing devices such as the Perkins Brailler, a slate and stylus, specialized embossers, or electronic displays which can operate stand-alone or serve as input and output terminals when connected to computers. More information about Braille is available at https://en.wikipedia.org/wiki/Braille. In addition to literary contexts, codes specific to the domains of math, science and music notation (which, like their print and typeset counterparts to literary text, bear little resemblance to literary Braille) have been developed over time. Common mathematical Braille codes include Nemeth, Unified English Braille (UEB), Computer Braille and UNICODE Braille.

Existing Braille translation systems are designed to translate primarily literary works, and in some limited cases mathematical works, but only as part of desktop software (such as the Duxbury Braille Translator or as part of screen reading programs such as JAWS for Windows and Apple's VoiceOver for the Mac and iOS platforms). There are few, if any, math-to-Braille libraries that exist for use in an online context that translate common mathematical coding formats such as LaTeX to common mathematical Braille codes. One other commonly known online Braille math input system, Pearson's Accessible Equation Editor (http://accessibility.pearson.com/aee), translates only a modified Nemeth syntax to MathML, and is unable to translate LaTeX into Nemeth and UEB, and cannot supply both equations and their answers in the user's preferred Braille code.

The Nemeth Braille code, developed by Dr. Alexander Nemeth, has been the standard set of rules and symbols for describing mathematics in the United States since 1972. It details comprehensive rules to describe many facets of math, including algebra, geometry, trigonometry, calculus and logic. The reference document (see link below) also includes numerous examples of mathematical expressions that have been incorporated in embodiments of the present invention to ensure accurate translation to and from LaTeX in the calculator of the present invention. While it is broadly known, Nemeth Braille code is used primarily in the United States and Canada. See Nemeth overview on Wikipedia (https://en.wikipedia.org/wiki/Nemeth_Braille) and The Nemeth Braille Code for Mathematics and Scientific Notation 1972 (https://nfb.org/images/nfb/documents/pdf/nemeth_1972.pdf)

For decades, English-speaking countries, such as the United States, Great Britain and Australia have written and maintained separate literary and scientific Braille codes. Though the literary specifications differ superficially from one another, the scientific notations are vastly dissimilar. As the electronic interchange of Braille documents has grown in popularity, blindness organizations in the above countries recognized a need to create an internationally recognized standard for creating distributing these files across national boundaries.

Unified English Braille, referred to hereinafter as UEB, was the result of many years' effort. It seeks to create a one-to-one mapping of all literary and scientific symbols to Braille dot patterns (which may encompass one or more cells). UEB is relatively new in comparison to older, more established codes, such as the previous United States literary and Nemeth math systems), and as a result there is much less documentation available aside from the official UEB technical guidelines. Also, while UEB became the standard for literary Braille in the United States in January 2016, it has been left for individual states to decide which system to use for technical material. Anecdotal research has shown that at the time of writing, Nemeth has much broader support than UEB. See UEB overview available at https://en.wikipedia.org/wiki/Unified_English_Braille and UEB Guidelines for Technical Material at http://www.brailleauthority.org/ueb/Guidelines_for_Technical_Material_2008-10.pdf.

Another form of Braille encoding, Computer Braille, defines an exact 1-to-1 relationship between the standard ASCII character set and a single Braille cell. It is what an end user reads and writes when his or her Braille device operates without an active translator, and it is the only mode of input and output available on every Braille device manufactured throughout the world. While it has been superseded by UEB as an official standard in many countries Computer Braille's uniform implementation across all modern electronic Braille devices makes it ideal for unambiguous input and output. See Overview of Computer Braille available at: https://en.wikipedia.org/wiki/Computer_Braille_Code and Computer Braille reference at http://www.brailleauthority.org/cbc/cbc2000.pdf.

The UNICODE Braille standard defines a block of characters, called "Braille Patterns," in the range U+2800 through U+28FF. The patterns comprise all possible 64 combinations of six dot Braille characters. See UNICODE Braille Patterns Overview at https://en.wikipedia.org/wiki/Braille_Patterns.

SUMMARY

The present invention relates to apparatuses and methods for enabling a user electronic device (e.g. a smart phone, tablet computer, or laptop or desktop computer) to display mathematical expressions and equations in graphical as well as visible typeset or touch-identifiable form in audio, visual and/or Braille formats to enable such graphical and mathematical expressions to be accessible to both able-bodied users as well as users with hearing and vision disabilities.

Some embodiments comprise a method for graphically representing mathematical expressions on a user device in an audiovisual format in accordance with embodiments of the present invention. Exemplary methods may comprise interpreting keyboard input from a user device as a typeset mathematical expression. Exemplary methods may further comprise parsing the typeset mathematical expression into an interpreted mathematical expression and compiling the interpreted mathematical expression into an evaluation function and sampling the evaluation function for at least one coordinate. Exemplary methods may also comprise rendering the sampled evaluation function for the coordinate as a graph configured for display of at least one user device; and generating an audible representation of the rendered graph configured for playback on the user device. Some embodiments of the present invention comprise systems and computer program products for graphically representing mathematical expressions on a user device in an audiovisual format. Such embodiments may be used in verbal output systems, which can be of benefit for persons relying on a screen reader to voice computer activity.

In some embodiments of the present invention, mathematical expressions are expressed using Braille. In one embodiment of the invention, a math-to-Braille library for use in an online context is described. In another embodiment of the invention, a JavaScript library is developed that translates mathematical expressions written in LaTeX to and from Braille and does not rely on third-party translation algorithms. Because UEB has been adopted as the standard Braille code across the majority of English-speaking countries, one embodiment of the present invention implements UEB as well as Nemeth Braille codes so that users are able to leverage the system with which they are most comfortable. In one embodiment of the invention, Nemeth Braille code rules may be applied for UEB translations in situations which the UEB technical guidelines may not have guidance (such as when adding whitespace after trigonometric function names).

In one embodiment of the invention, Computer Braille encoding is used in translating mathematical expressions from Braille. For example, a Braille keyboard may be used in one embodiment of the invention to transmit text to a personal desktop or laptop computer or other user device, and Computer Braille encoding ensures that one ASCII character is transmitted for each typed symbol. Alternatively, raw keyboard input from a connected display may be received in Computer Braille mode for translation to other Braille codes or to a typewritten mathematical expression (for example, in LaTeX).

In some embodiments of the present invention, a Braille translator receives input consisting exclusively of Braille Patterns when converting from Nemeth to UEB. Likewise, Nemeth and UEB output is returned as a series of Braille Patterns. Such a translator may also include methods to convert between Computer Braille and Braille Patterns to facilitate handling input from standard QWERTY keyboards or other similar devices which emit traditional alpha-numeric characters.

Various objects, features, aspects and advantages of the inventive subject matter will become more apparent from the following detailed description of preferred embodiments, along with the accompanying drawing figures in which like numerals represent like components. The following detailed description is presented to enable any person skilled in the art to make and use the invention, and is provided in the context of particular applications and their requirements.

Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

BRIEF DESCRIPTION OF THE DRAWINGS

For the purposes of illustration only, several aspects of particular embodiments of the invention are described by reference to the following figures.

DETAILED DESCRIPTION

Figure 1:
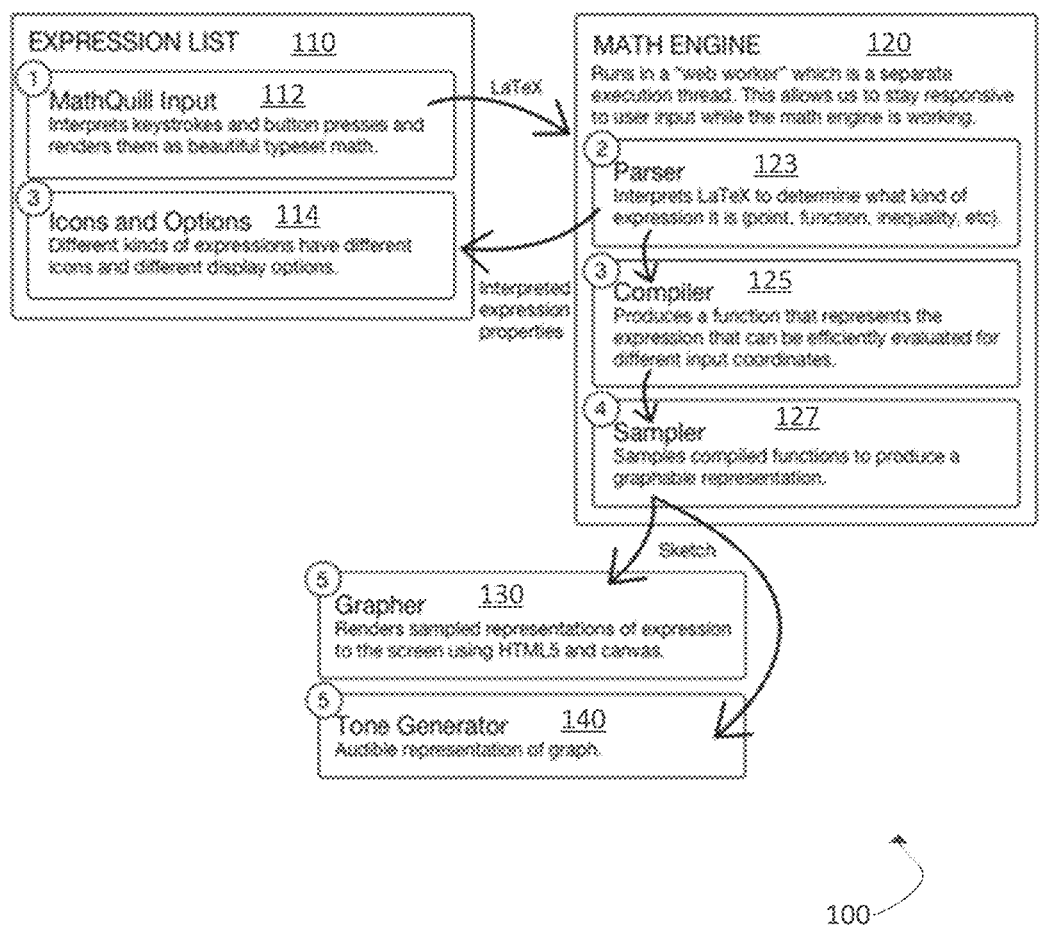
FIG. 1 illustrates a block diagram of an Internet-enabled audio-visual graphing calculator according to an embodiment of the present invention.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

As used in the description herein and throughout the claims that follow, when a system, engine, module, device, server, or other computing element is described as configured to perform or execute functions on data in a memory, the meaning of "configured to" or "programmed to" is defined as one or more processors being programmed by a set of software instructions stored in the memory of the computing element to execute the set of functions on target data or data objects stored in the memory.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Exemplary System Configurations

Embodiments of the present invention have been tested with commonly available desktop and mobile device, operating system, web browser, and adaptive technology combinations to help ensure that the calculator is compatible with as many commonly used user configurations as possible. For example, features described in embodiments of the present invention have been tested in conjunction with the following system configurations:

For the Windows operating system:
OS Version: Windows 7, 8.1, or 10
Screen Reader: JAWS for Windows 17+, Microsoft Narrator (Windows 10 only), NVDA 2016.2+, or Window-Eyes 9.5.3+
Web Browser: Google Chrome 54+, Microsoft Edge (Windows 10 only), Internet Explorer 11, or Mozilla Firefox 46+
For the Mac operating system:
OS Version: OSX 10.11+
Screen Reader: VoiceOver (included with the operating system)
Web Browser: Apple Safari or Google Chrome 54+
For the iPhone and iPad device platforms:
OS Version: iOS 9+
Screen Reader: VoiceOver (included with the operating system)
Web Browser: Apple Safari
For the Android device operating system platform:
OS Version: Android 5.1+
Screen Reader: Talkback (included with the operating system)
Web Browser: Google Chrome 54+

Note that other previous, present and future versions of these operating system, screen reader, and browsers may also be compatible with accessibility features discussed in conjunction with embodiments of the present invention as described below, but the functionality and features have not been fully tested with respect to these alternative versions. Embodiments of the present invention may also work with other operating system, screen reader, and browser versions outside of those listed above, that are nonetheless enabled to work on the Internet using TCP/IP and other commonly used networking and communication protocols.

The audiovisual, Internet-enabled graphing calculator described in embodiments of the present invention is a rich web application which utilizes both client and server-side components, may be implemented using multiple languages and may leverage existing and home-grown user interface frameworks. Embodiments of the present invention are optimized to run on the client side of the application which is written using a combination of JavaScript, jQuery (www.jquery.org), UnderscoreJS templating (www.underscorejs.org), and an internally developed model/view/controller system called DCGView, which is similar in many respects to ReactJS (www.reactjs.org).

The features described below depend on several calculator components used and included in the present invention shown in FIG. 1 at calculator 100. The code comprising the behavior of these calculator components, is created specifically for the Internet-enabled audio-visual graphing calculator of the present invention. Embodiments of the present invention comprise an input interface 110 comprising an expression item list that includes one or more expression items, where an expression item comprises an input box or module 112 that may receive and interpret a series of keystrokes, button presses, or other input as a typeset mathematical expression. In some embodiments of the present invention, input interface 110 may also comprise icons and options 114 which may include icons and/or options to show or hide a curve from the graph, change the color or style of a curve, play or pause a slider, or show, hide, or change the opacity of an image on the graph. You may also be able to select an expression list item here and duplicate, delete, move, or modify it. In some embodiments of the invention, the space to the left of an expression item in input box or module 112 comprises one or more checkboxes or selector buttons that a user may select to change the color, style, delete it, etc.

The input interface 110 is configured to transmit a typeset mathematical expression (e.g., in LaTeX typesetting format) to math engine 120. In one embodiment of the present invention, math engine 120 runs in a "web worker" or separate execution thread, thus allowing the graphing calculator to stay responsive to user input while the math engine is working. In embodiments of math engine 120, parser 123 interprets the LaTeX or other typeset mathematical expression to determine what kind of expression it is (e.g., point, function, inequality, polar (expressions with r and theta ($\theta$) variables), piecewise, functions with regressions, expression lists, list expressions, functions with domain and range restrictions). Compiler 125 evaluates the expression, and where feasible, produces a function that represents the expression and that can be efficiently evaluated for different input coordinates, so that sampler 127 can sample the compiled functions at various input values to produce output sketch data, which can be used to produce a graphical representation. This sketch data is transmitted to the grapher 130 which renders sampled representations of expressions to the grapher interface, which in one embodiment of the present invention is a graph window that resembles graph paper in appearance, and renders the graphical form of the expression using HTML and canvas as described further below. In some embodiments of the present invention, a tone generator module 140 utilizes the sketch data to produce an audible representation of the graph that may be played back to the user as described in further detail below.

Figure 2:
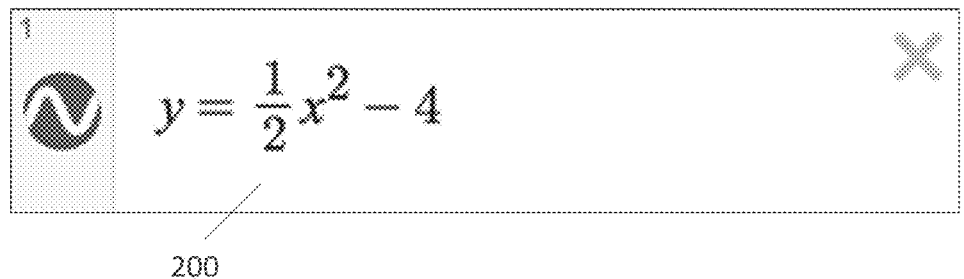
FIG. 2 illustrates an exemplary screenshot of an exemplary expression item according to an embodiment of the present invention.

FIG. 2 shows an input interface comprising an expression item 200 used in embodiments of the present invention, wherein the expression item includes an editable field where the end user can input an equation either through a conventional visual keyboard or handwriting (e.g. stylus and tablet) input interface, or other interface such as a Braille input/output device or a speech-to-text device that may be of benefit to disabled users with visual impairments. Speech-to-text software includes applications like Dragon Naturally Speaking, Windows Dictation, and the built-in dictation features available in the Mac operating system. Braille input devices include products such as the HumanWare BrailleNote Touch, HIMS BrailleSense and Braille Edge, Baum Vario 20/40, Freedom Scientific Focus 14/40/80, and the HandyTech ActiveBraille. In an embodiment of the present invention, an expression item may comprise a typeset mathematical expression rendered in LaTeX typesetting format. In some embodiments of the present invention, an expression item may also comprise items that are not mathematical expressions such as folders, tables, notes, and images. Folders allow grouping expression items, collapsing groups of expression items, and showing/hiding a whole group of expression items at once. Tables may comprise tabular data such as spreadsheet data. Notes may comprise alphanumeric text entered into an empty text box, and may be of variable length. Images may also be uploaded in the input interface by selecting an image by navigating a file directory tree or dragging an image on to the expression list. In some embodiments of the invention, the image may serve as a background for the grapher interface, for example. In a preferred embodiment of the present invention, the input interface is configured to allow user editing of image position and size by manually editing the settings in the expression list, or dragging selected areas, such as the corners and/or edge areas of the graph paper on the grapher interface window.

In an embodiment of the present invention, the input interface component may utilize code from the open-source MathQuill component (www.mathquill.com) which may be adapted provide features needed for screen reader, speech-to-text, and/or Braille accessibility for visually impaired users.

Figure 3:
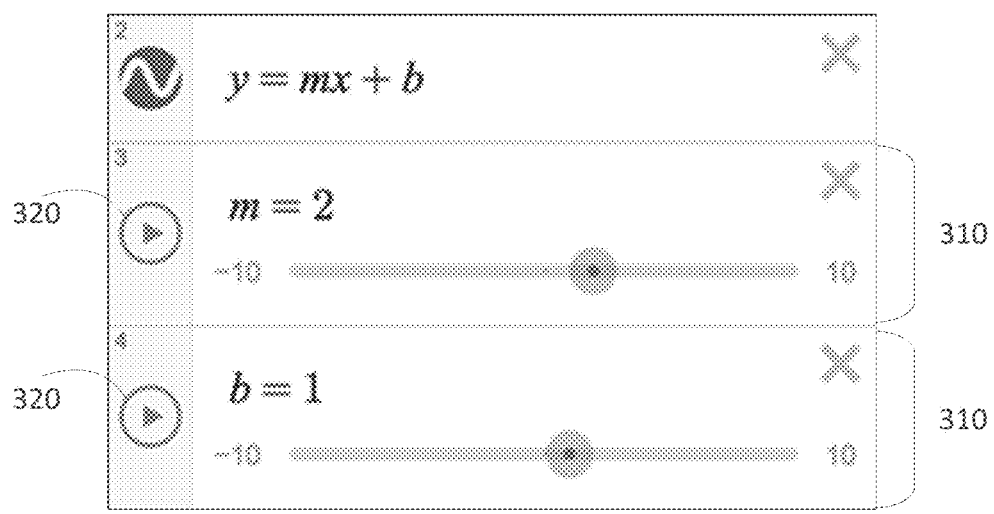
FIG. 3 illustrates an exemplary screenshot of an exemplary expression list with three expression items according to an embodiment of the present invention.

Slider:

a draggable control representing a single variable. The slider can be set to animate, causing its value to oscillate between the slider's minimum and maximum values, thereby allowing one to see how the change affects the parent expression and its graph over time. Two examples of sliders are shown at 310 in FIG. 3, with the animate controls at 320.

Figure 4:
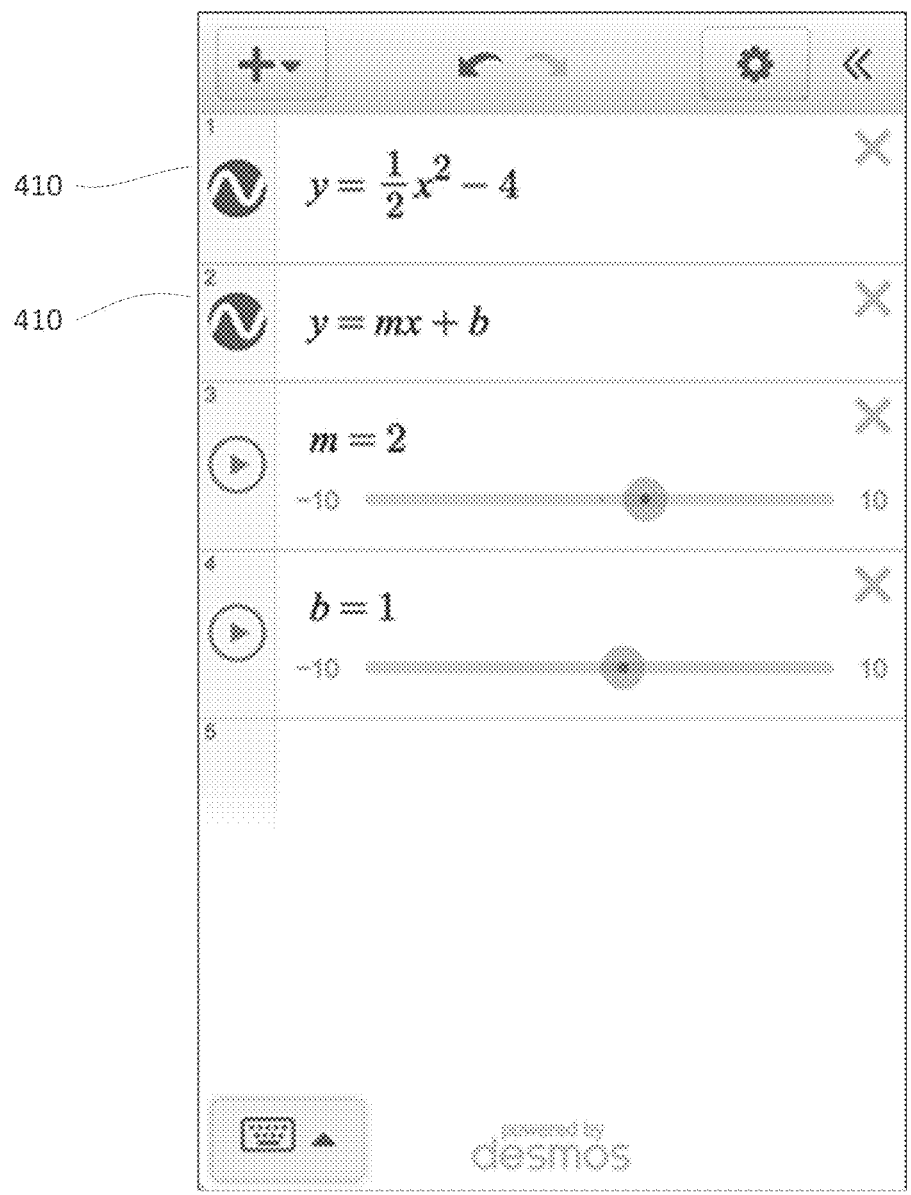
FIG. 4 illustrates an exemplary screenshot of an exemplary expression list user interface with four expression items according to an embodiment of the present invention.

Expression List:

A list view-style control holding one or more expression items 410 as shown in FIG. 4.

An evaluator is a program object which monitors changes to an expression and determines if it is evaluable, graphable, or contains errors. Unlike a built-in JavaScript expression evaluator, the evaluator counterpart present in embodiments of the present invention will also explain the mistake (when possible) and understands a much richer set of mathematical constructs.

A grapher program object is the root object in charge of drawing graphs on the screen used in embodiments of the present invention. This object contains an HTML5 canvas on which lines for each graph's curve are drawn. Each piece of a curve, referenced internally as a sketch segment, is computed by the evaluator and retrieved from the graph's sketch data object. The set of segments representing a curve are stored as a single data object, called a graph layer, within the grapher. The grapher also holds functions for drawing grid lines and dots representing points of interest. Grid lines are drawn first, followed by each graph layer, and finally the POI dots.

Figure 5:
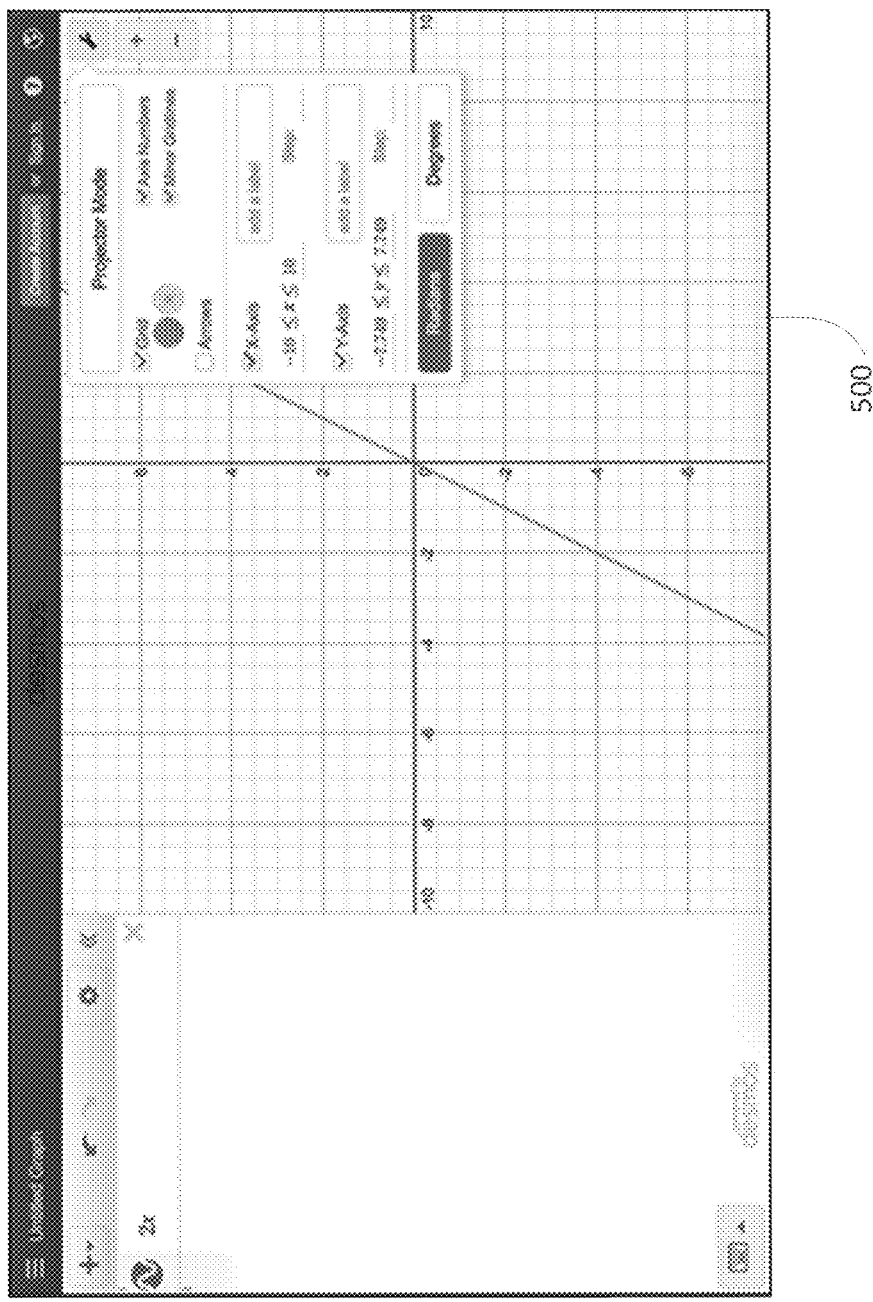
FIG. 5 illustrates an exemplary screenshot of an exemplary audio-visual graphing calculator user interface according to an embodiment of the present invention.
Figure 6:
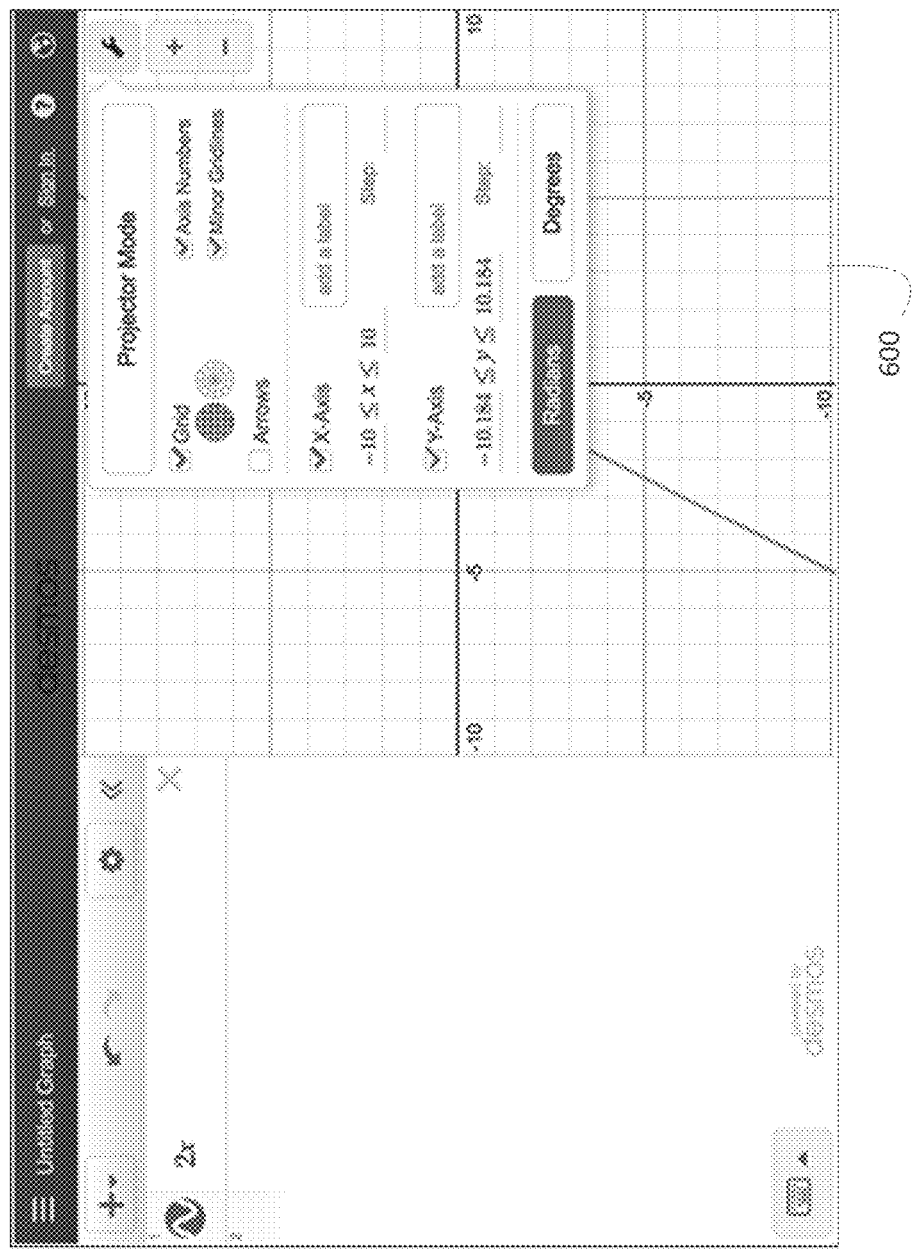
FIG. 6 illustrates another exemplary screenshot of an exemplary audio-visual graphing calculator user interface according to an embodiment of the present invention.

The grapher uses two objects to define the scope and resolution of the curves shown on screen. First is the projection data object, which holds properties reflecting the active screen resolution. The second piece, known as the viewport, contains the range of X and Y coordinates (stored as minimums and maximums for each) which are to be displayed. When the window is resized, the limits of the x-axis are kept and the y-axis is scaled as needed. For example, FIG. 5 shows a graph 500 displayed on a 1200×700 pixel window. FIG. 6 shows the example graph 500 of FIG. 5 resized to a 900×600 pixel window. Further details about graphable expressions, variables and sliders, and settings, zoom and language, and other topics are discussed in the Desmos User Guide publication, available for download at https://desmos.s3.amazonaws.com/Desmos_User_Guide.pdf, which is incorporated by reference in its entirety.

Figure 7:
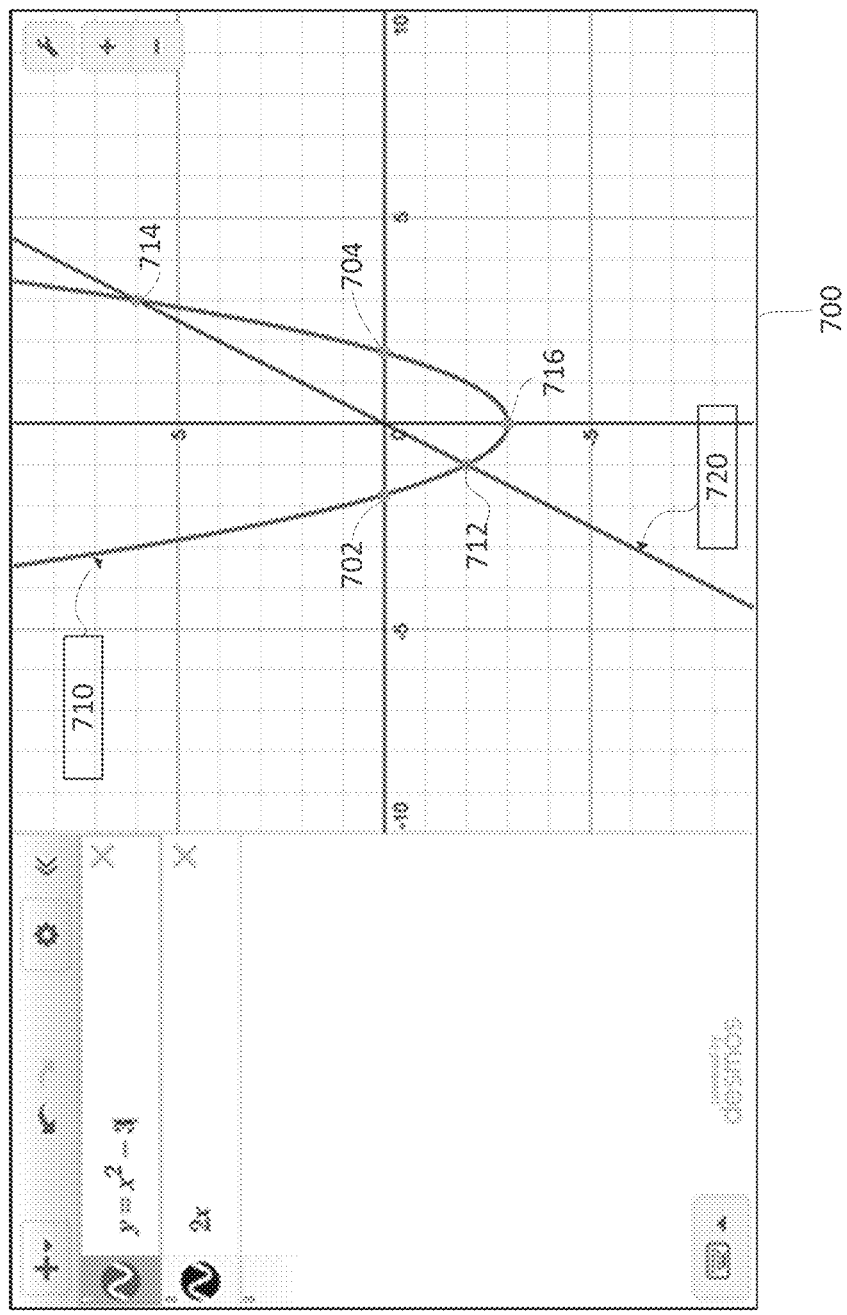
FIG. 7 illustrates an exemplary screenshot of an exemplary expression list user interface with two expression items and a graph according to an embodiment of the present invention.

Sketch:

A data object retrieved from the grapher which represents the curve derived from an evaluated expression. The sketch holds additional properties, including the number of branches in the curve, and a list of points of interest (POIs). If an expression has more than one solution, each possible answer (or set of answers) is represented on its own branch within the same sketch. POIs include a graph's minimum, maximum, zero-crossing, X/Y intercept, and intersections with other curves. The following graphs illustrate these concepts:

For example, FIG. 7 shows a graph 700 with 5 points of interest: x-intercepts and zero crossing 702 and 704 for the parabola 710 depicting the equation $y=x^2-3$; points of intersection 712 and 714 with the line 720 $y=2x$; and minimum and y-intercept and zero crossing 716 for the parabola 710.

Figure 8:
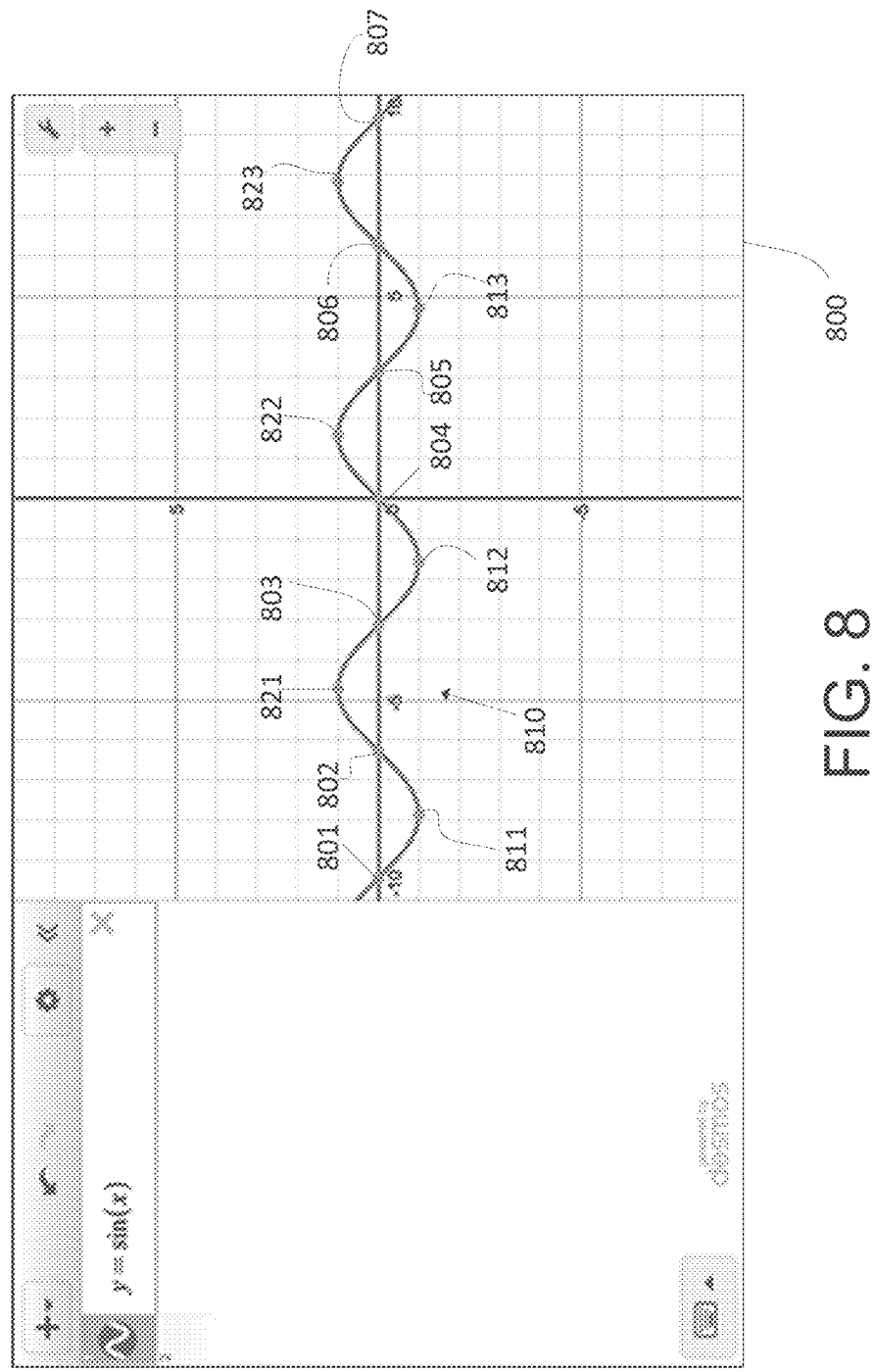
FIG. 8 illustrates an exemplary screenshot of an exemplary expression list user interface with one expression item and a graph according to an embodiment of the present invention.

For example, FIG. 8 shows a graph 800 for the function $y=\sin(x)$ with 13 points of interest along the sine wave 810: x-intercept and zero crossing 801, 802, 803, 804 (also a y-intercept and zero crossing at origin (0,0)), 805, 806 and 807. Local minimums are at points 811, 812 and 813. Local maximums are at points 821, 822 and 823.

Figure 9:
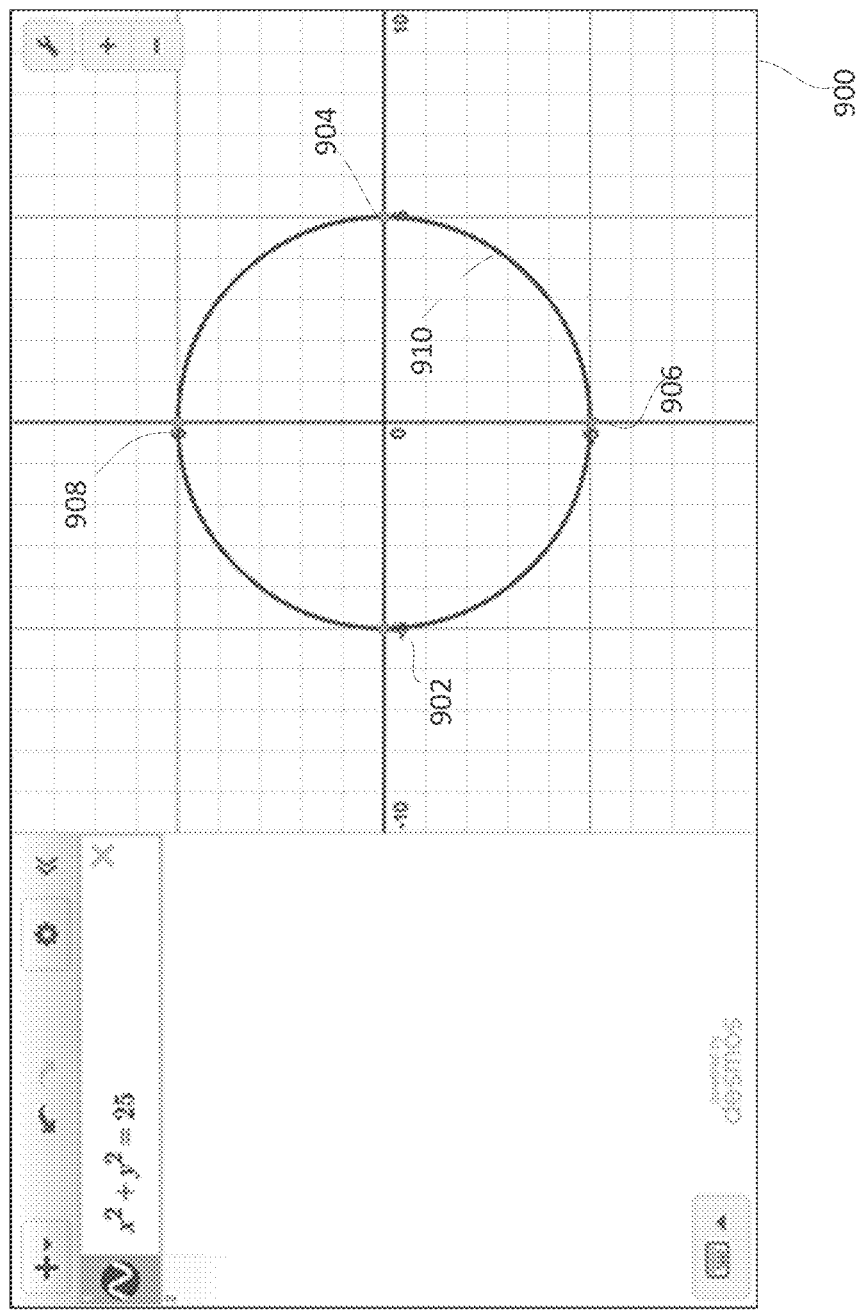
FIG. 9 illustrates another exemplary screenshot of an exemplary expression list user interface with one expression item and a graph according to an embodiment of the present invention.

As another example, FIG. 9 shows a graph 900 for the function $x^2+y^2=25$ with 4 points of interest along circle 910: x-intercepts and zero crossings 902 and 904, and y-intercepts and zero crossings 906 and 908.

Also worth noting is that the sketch updates in real-time based on changes to its associated expression (whether it be a manual edit or influenced by an animating slider).

Embodiments of the present invention also include the following program objects to enable audio representation of mathematical expressions and graphs:

The ARIA object is a program object designed specifically to send ARIA alerts to the browser, which then conveys the text to an active screen reader. The module can either accept one or more strings of text to be queued for later verbalization, or be passed a message to be immediately spoken. This module has been designed to operate with all modern operating systems, browser, and screen reader combinations which support the WAI-ARIA specification (WAI-ARIA specification version 1.1 is available at https://www.w3.org/TR/wai-aria-1.1), and thus is a core component in providing voiced output throughout the calculator. As discussed on the WAI-ARIA Wikipedia entry at https://en.wikipedia.org/wiki/WAI-ARIA, web developers increasingly use client-side scripts to create user interface controls that cannot be created with HTML alone. They also use client-side scripts to update sections of a page without requesting a completely new page from a web server. Such techniques on websites are called rich Internet applications. These user interface controls and content updates are often not accessible to users with disabilities, especially screen reader users and users who cannot use a mouse or other pointing device. WAI-ARIA allows web pages (or portions of pages) to declare themselves as applications rather than as static documents, by adding role, property, and state information to dynamic web applications. ARIA is intended for use by developers of web applications, web browsers, assistive technologies, and accessibility evaluation tools.

WAI-ARIA describes how to add semantics and other metadata to HTML content to make user interface controls and dynamic content more accessible. For example, with WAI-ARIA it is possible to identify a list of links as a navigation menu and to state whether it is expanded or collapsed. Although originally developed to address accessibility issues in HTML, the use of WAI-ARIA is not limited to HTML: in principle, it can also be used in other markup languages such as Scalable Vector Graphics (SVG).

Embodiments of the present invention also include an audio graph program component that is responsible for announcing when focused expressions contain graphs, listening for all audio graphing hotkeys (including those to enter and exit audio trace mode), sample the navigable points of a curve, describe graph points, etc. This module also takes the active browser and operating system into account to ensure the hotkeys and audio behaviors provided are appropriate and feel native. For example, if the operator is using a Mac, the calculator instructs the user to press OPTION+S and OPTION+T to retrieve a summary or activate audio trace, whereas he will be told to press ALT+S and ALT+T on Windows. The calculator also accepts different hotkey modifiers based on the active platform to avoid conflicts with the user's browser. In Windows, the user can press ALT++, ALT+−, and ALT+0, to increase, decrease, and restore the graph's zoom level. On a Mac; CTRL++, CTRL+−, and CTRL+0 adjust the calculator's zoom level.

Finally, if the end user is on an iOS device (such as an iPhone or iPad) and using Apple's built-in screen reader called VoiceOver, the end user is instructed to use the I, J, K, and L keys to navigate (rather than the Arrows) while audio trace is active. This change is used in some embodiments of the present invention because Apple does not currently permit app developers to watch for Arrow keypresses in iOS Safari.

Additional details on how the user interacts with graphs via audio trace in embodiments of the present invention are described further below.

The tone generator program object comprises a module responsible for audio output in embodiments of the present invention. This module utilizes the HTML5 waveform synthesis capabilities found in many popular modern web browsers including Firefox, Chrome, Safari, and Edge. More information regarding the HTML5 audio standard is available at https://www.w3.org/TR/webaudio.

A significant advantage to leveraging HTML5 audio in the calculator is that most modern browsers support the creation and manipulation of simple waveform oscillators including sine, square, triangle, and sawtooth waves through a standardized API described at https://developer.mozilla.org/en-US/docs/Web/API/OscillatorNode. In some embodiments of the present invention, the tone generator preferably generates triangle waves as they sound richer than sine waves, but are not as audibly harsh as square waves.

The tone generator creates three oscillators: the primary triangle wave representing the X/Y position of a point, a secondary triangle wave played at ¼ volume and an octave above the primary wave whenever the independent variable is less-than 0, and a brown noise buffer containing static which is played if the currently selected point cannot be computed, the dependent variable is off-screen, or when the dependent variable is less-than 0.

Figure 10A:
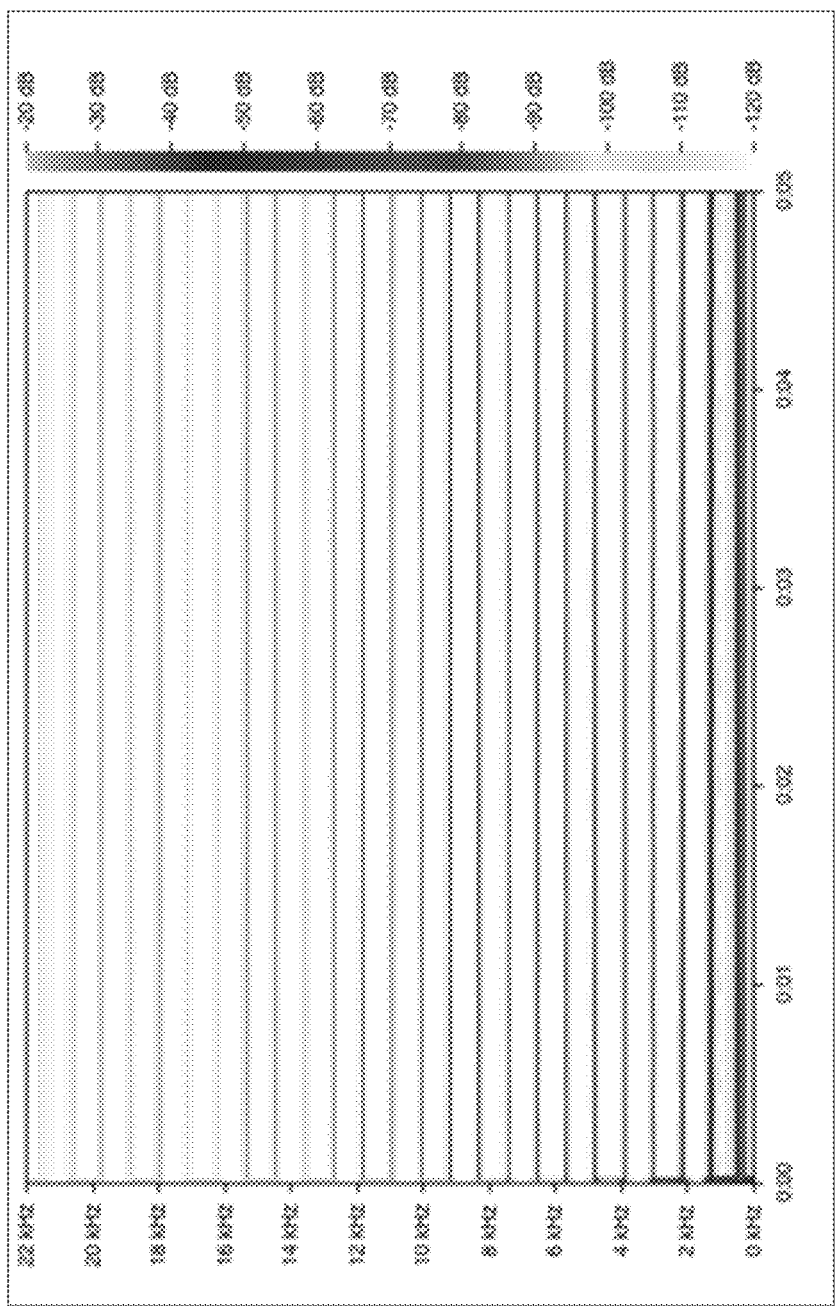
FIG. 10A illustrates an exemplary graph showing an exemplary primary triangle wave at 440 hertz according to an embodiment of the present invention.

FIG. 10A is a graph showing an exemplary primary triangle wave at 440 hertz used in one embodiment of the present invention.

Figure 10B:
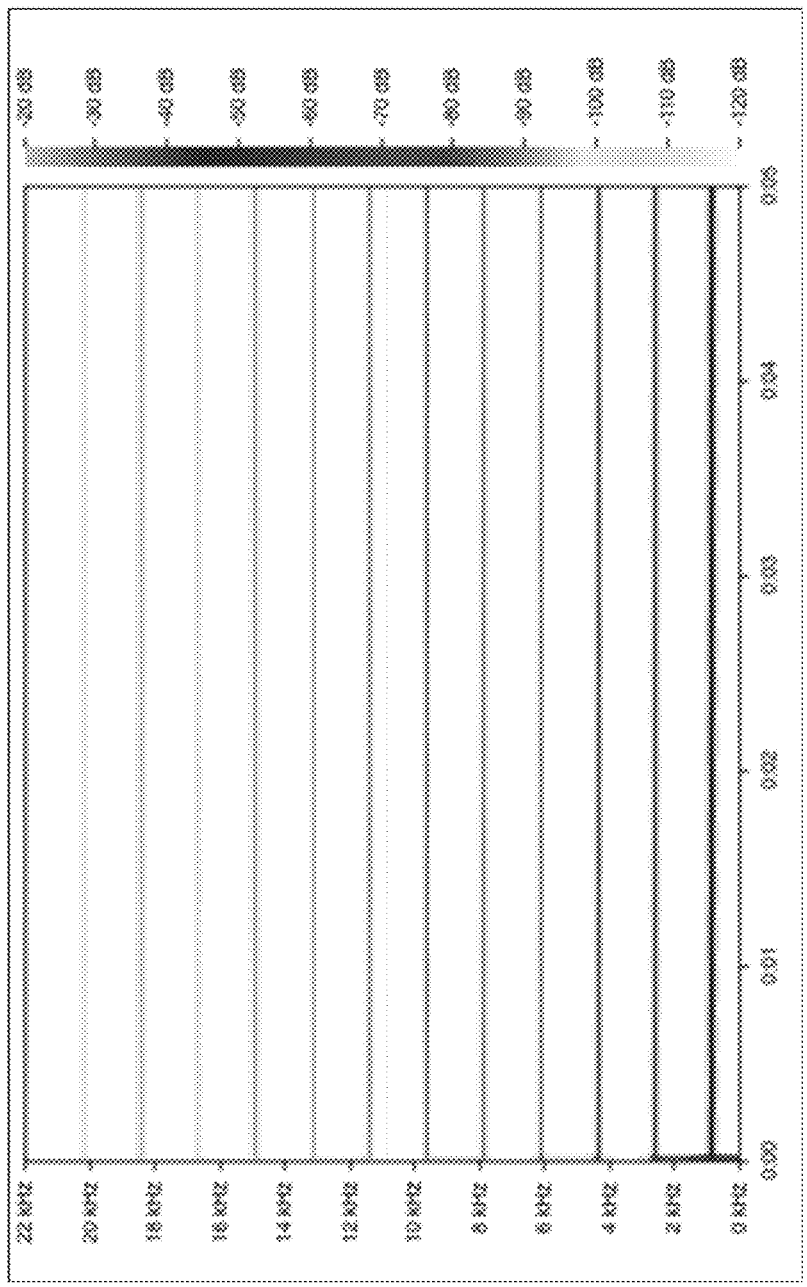
FIG. 10B illustrates an exemplary graph showing an exemplary secondary triangle wave at 880 hertz and 25% amplitude according to an embodiment of the present invention.

FIG. 10B is a graph showing an exemplary secondary triangle wave at 880 hertz and 25% amplitude used in one embodiment of the present invention.

Figure 10C:
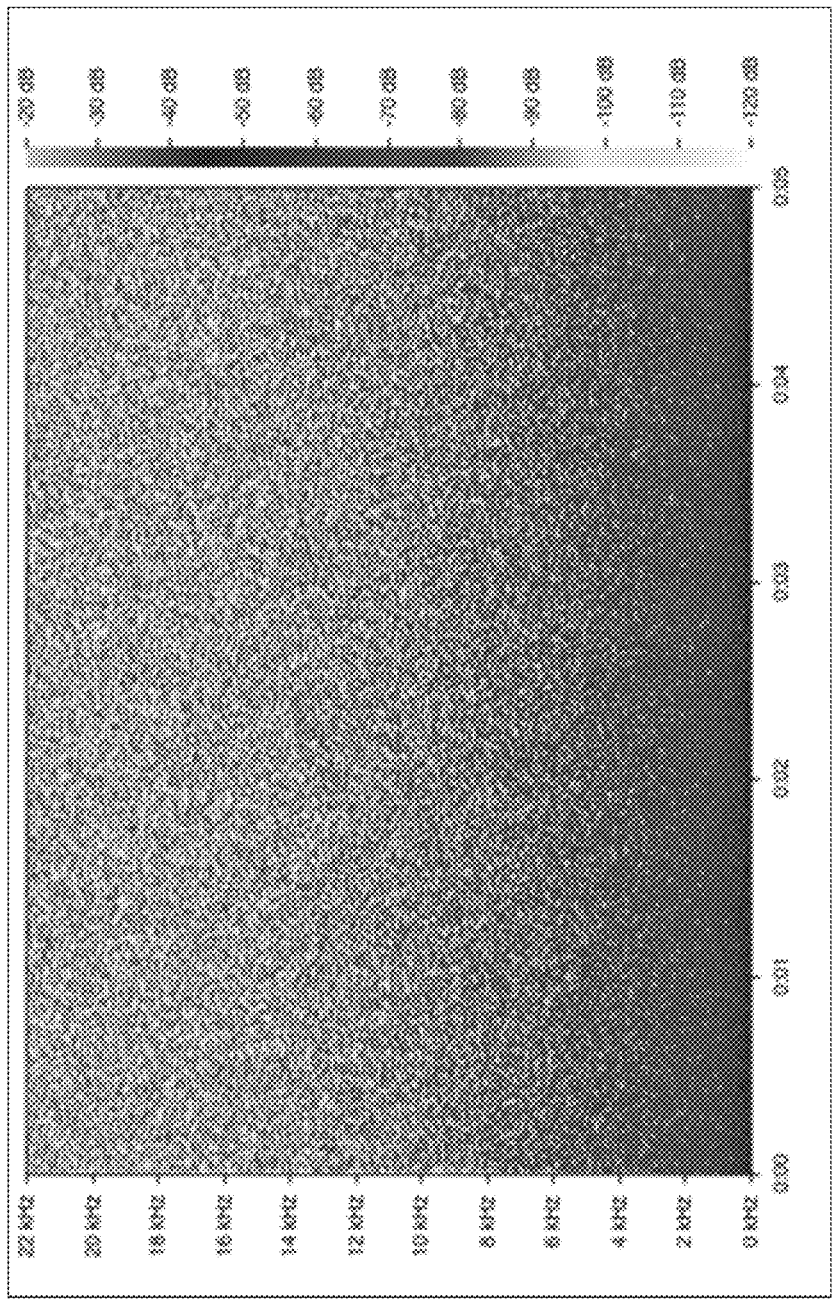
FIG. 10C illustrates an exemplary graph showing sample brown noise according to an embodiment of the present invention.

FIG. 10C is an exemplary graph showing sample brown noise used in one embodiment of the present invention.

The following simplified example code demonstrates how an exemplary primary triangle wave is created in some embodiments of the present invention, and connected to the active audio context (which is the user's audio output device):
var audioCtx=new (window.AudioContext||window.webkitAudioContext)( );
var primaryTriangleWave=audioCtx.createOscillator( );
primaryTriangleWave.type='triangle';
primaryTriangleWave.frequency.value=440; // value in Hz
primaryTriangleWave.connect(audioCtx.destination);
primaryTriangleWave.start( );

In some embodiments of the present invention, an additional sound asset which sounds like a brief "pop" is also loaded and plays when the selected curve intersects another. The tone generator is also responsible for translating a given point's coordinates, based on which variable the evaluator determines is dependent vs. independent and relative to its position in the viewport, into a frequency and panning value which approximates the point's onscreen position.

To illustrate the audiovisual representation of a graphed function in embodiments of the present invention, FIGS. 11A-11D show four exemplary graphs for y=1, y=−1, y=sqrt(x) and 2 intersecting function curves and respective spectrograms generated for each of these functions through the operation of an embodiment of the present invention.

Figure 11A:
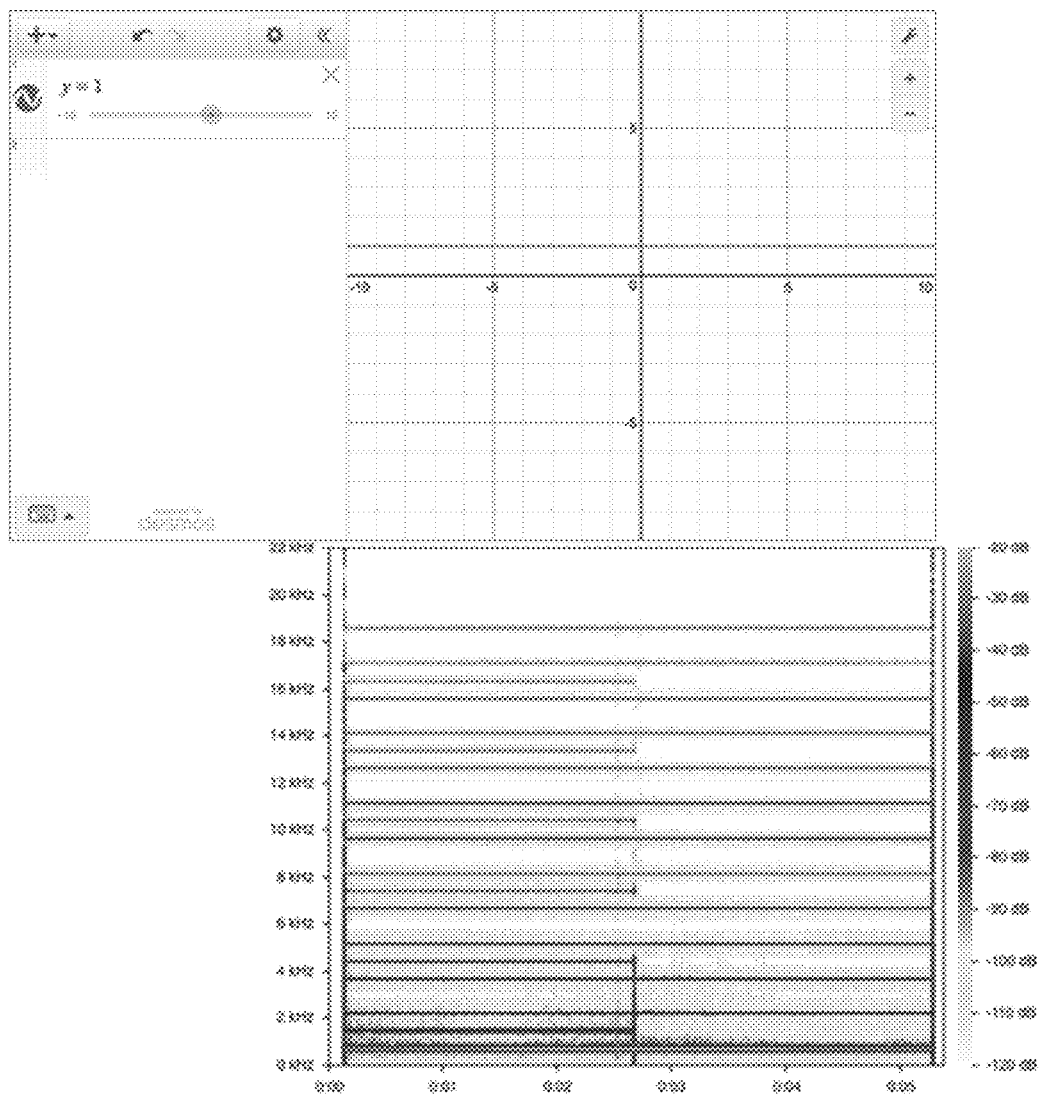
FIG. 11A illustrates an exemplary screenshot of a first exemplary expression list user interface with one expression item and a graph, and corresponding spectrogram according to an embodiment of the present invention.

Spectrogram for y=1:

The spectrogram shown in FIG. 11A shows the change in tone that indicates negative or positive x coordinates. When the x coordinate is positive, the tone is a triangle wave, which is made up of a fundamental tone with a frequency proportional to the y coordinate and a series of its harmonics, visible on the spectrogram as a stacked series of lines. When the x coordinate is negative, a second triangle wave an octave higher than the fundamental is added, and this is visible in the spectrogram as a richer set of lines.

Figure 11B:
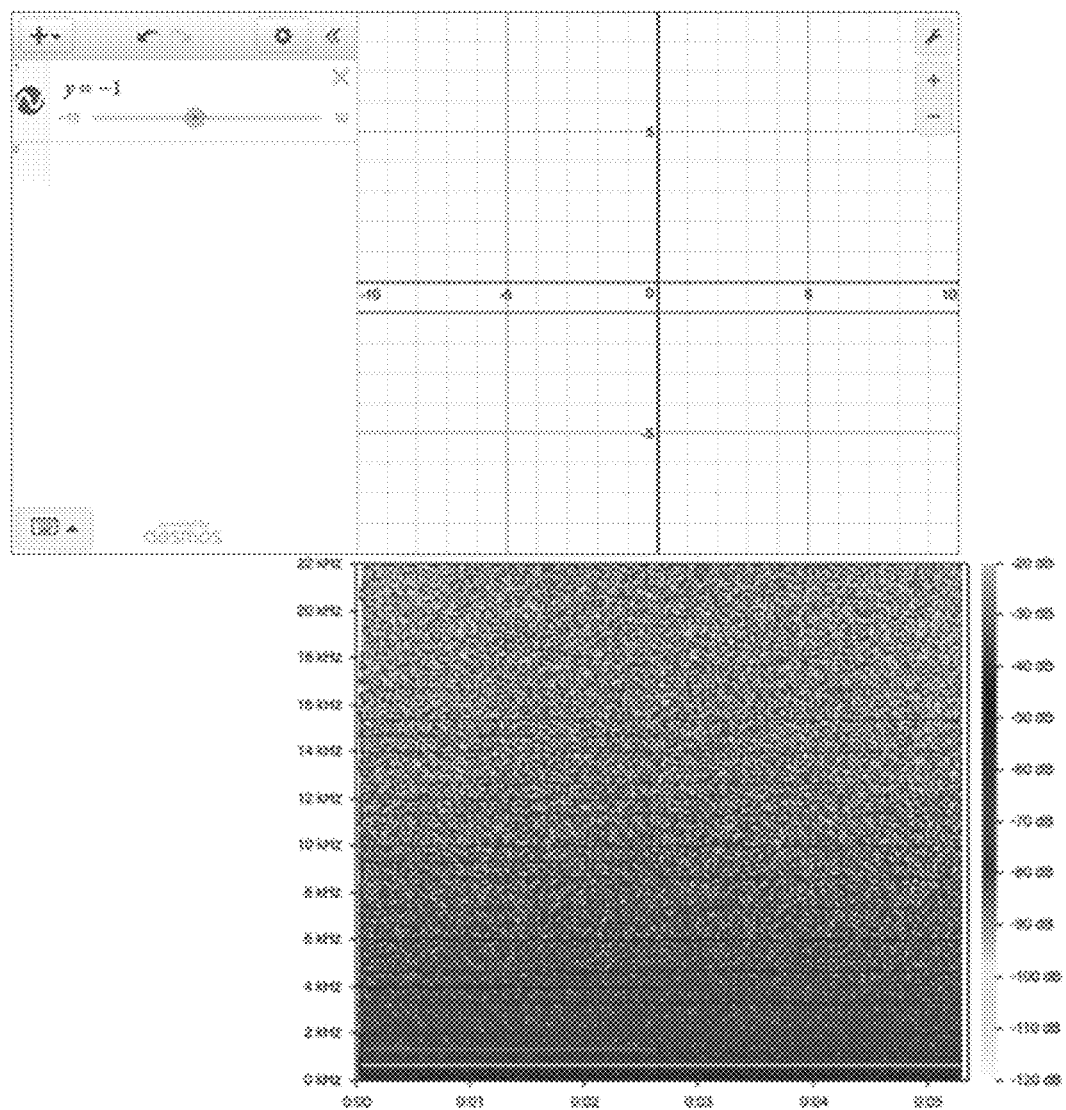
FIG. 11B illustrates an exemplary screenshot of a second exemplary expression list user interface with one expression item and a graph, and corresponding spectrogram according to an embodiment of the present invention.

Spectrogram for y=−1:

The spectrogram shown in FIG. 11B shows how negative y coordinates are audibly represented: when the y coordinate is negative, brown noise (noise that is richer in low frequencies than high frequencies) is added to the triangle wave. This gives a discrete indicator of when the y coordinate is negative or positive, in addition to the smoothly changing indicator of its value represented by the frequency of the triangle wave.

Figure 11C:
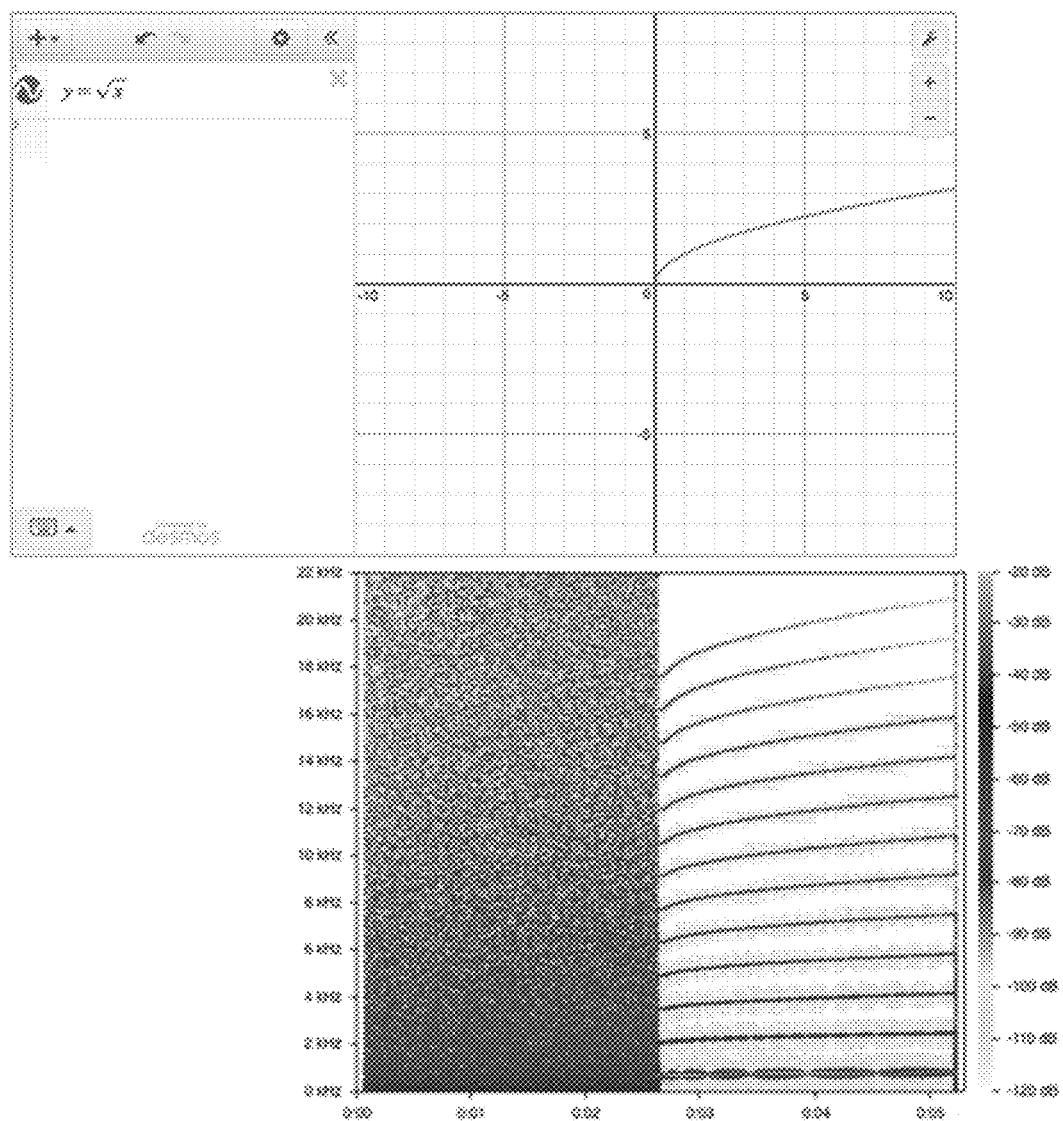
FIG. 11C illustrates an exemplary screenshot of a third exemplary expression list user interface with one expression item and a graph, and corresponding spectrogram according to an embodiment of the present invention.

Spectrogram for y=sqrt(x):

The spectrogram shown in FIG. 11C shows how regions of the graph where the curve is undefined are represented. In undefined regions, only brown noise is used, with no triangle wave. Since sqrt(x) is undefined for x<0, the portion of the spectrogram representing x<0 represents only brown noise. In the positive portion of the spectrogram, the frequency of the triangle wave rises in proportion to the y value of the curve.

Figure 11D:
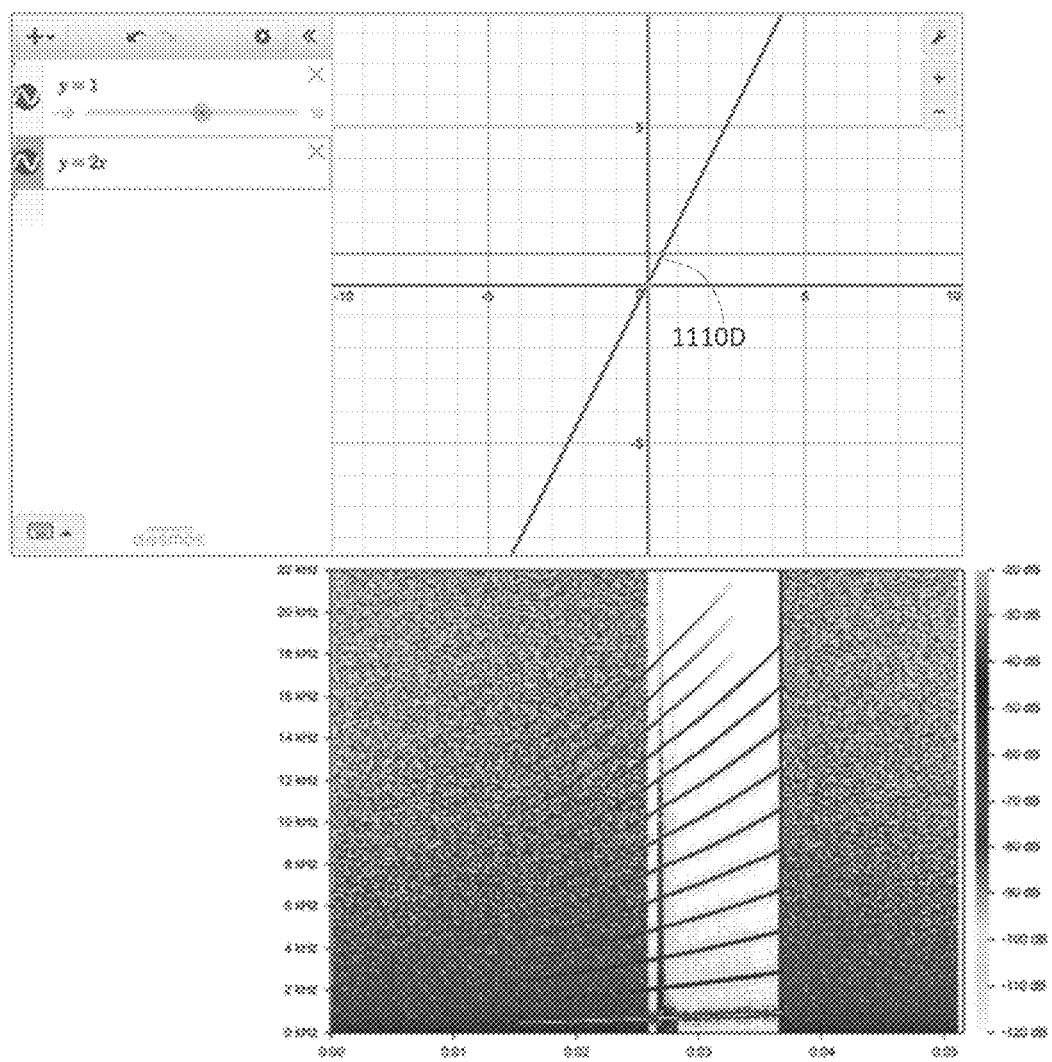
FIG. 11D illustrates an exemplary screenshot of a fourth exemplary expression list user interface with one expression item and a graph, and corresponding spectrogram according to an embodiment of the present invention.

Spectrogram for Intersecting Curves:

The spectrogram shown in FIG. 11D shows how intersections between two curves are represented. At points where two curves cross (here, x=½, y=1) at element 1110D, a "pop" sound is played. This sound is visible on the spectrogram as a vertical bar at x=½. This spectrogram also shows the frequency of the triangle wave increasing in proportion to the y coordinate, brown noise for negative y coordinates, and additional harmonics for negative x coordinates.

Figure 12:
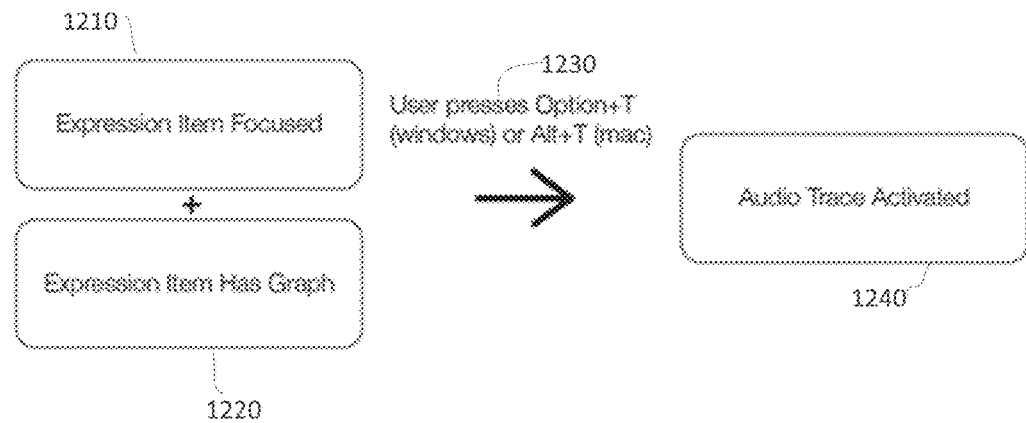
FIG. 12 illustrates an exemplary flowchart depicting a method of activating an audio tracing function according to an embodiment of the present invention.

The audio graph tracing capability is set forth in FIG. 12. When a mathematical expression which has keyboard focus at step 1210 and has an associated graph displayed on the screen at step 1220, an audio graph module used in embodiments of the present invention alerts the user to this fact and prompts him to press ALT+S (or OPTION+S on Mac) to hear a summary (not shown), or ALT+T (or OPTION+T on Mac) at 1230 to enter audio trace mode at step 1240.

When listening to a graph through audio trace, changes in the stereo field reflect the value of the independent variable, and changes in the pitch reflect the dependent variable.

Static will also be heard along with the tone when the dependent variable is less than 0, or by itself if the variable is undefined. In addition, the timbre of the tone changes when the independent variable is less than or greater than 0. A brief "pop" will sound whenever two curves intersect.

For example, consider the equation for a simple sine curve: y=sin(x). When audio trace is active, the tone being played moves from left to right as x increases, and the tone's pitch rises and falls as the y-value changes. In addition, the resonance of the tone morphs once it crosses the X axis, and static (brown noise) plays whenever y moves below 0.

Figure 13:
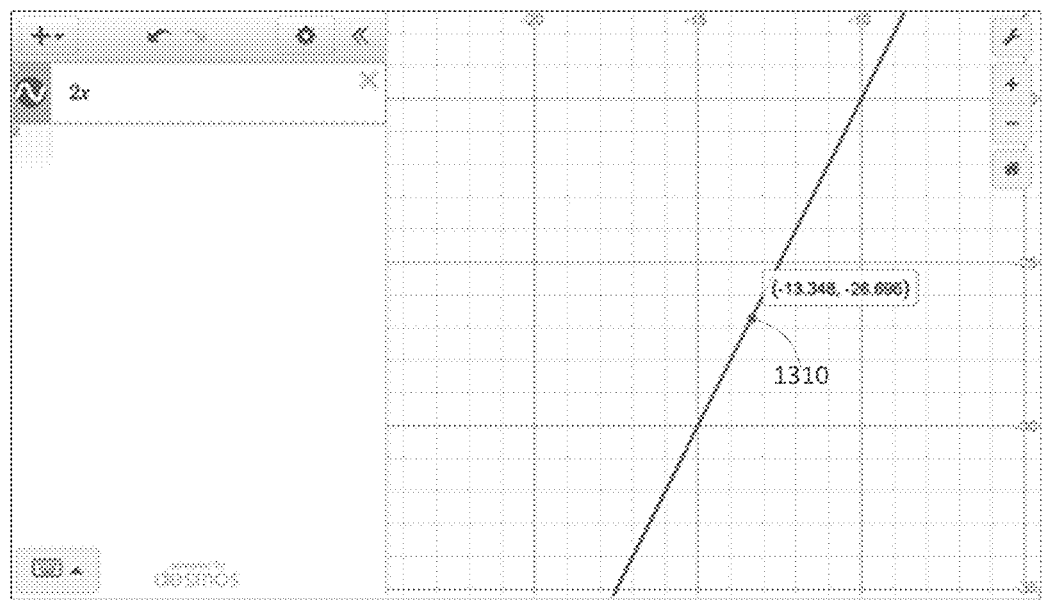
FIG. 13 illustrates an exemplary screenshot of an exemplary expression list user interface with one expression item and a graph shown with an audio tracing function in an activated state according to an embodiment of the present invention.

When audio trace is activated, the following activities occur:
  The graph sketch for the selected expression is retrieved.
  The sketch is checked for validity and whether it has any branches. If either fail, an error is returned and audio trace is deactivated.
  The tone generator is made active.
  All animating sliders are paused.
  The viewport bounds are retrieved.
  The distance between the minimum and maximum points for the independent variable is divided by 100 for both the X and Y axis, and saved as the X and Y "step value." These steps are computed from the minimum and maximum X and Y values of the previously described viewport data object as follows:
    var xmin=viewport.xmin;
    var xmax=viewport.xmax;
    var xstep=Math.abs(xmax−xmin)/100;
    var ymin=viewport.ymin;
    var ymax=viewport.ymax;
    var ystep=Math.abs(ymax−ymin)/100;
  The value of the active independent variable which represents the user's position on screen is set either to the graph's origin, or if not on screen, the midpoint of the viewport, as shown in midpoint 1310 in FIG. 13.
  The current independent variable is passed to a method which returns its associated point (including X, Y, branch number, and POI type). This, in turn, is set as the current selected point.

After these steps are completed, an announcement that audio trace is activated is spoken, a list of animating variables is given (if applicable), and the coordinates of the selected point are voiced along with its audio representation.

While in audio trace mode, the user can move between computed points within the visible portion of the graph shown on screen using the following commands:

| HOTKEY | Windows | Mac |
| --- | --- | --- |
| Previous Point | Left Arrow, Up Arrow, or J | Left Arrow, Up Arrow, or J |
| Next Point | Right Arrow, Down Arrow, or L | Right Arrow, Down Arrow, or L |
| Previous Point of Interest | Page Down, SHIFT+TAB, or K | FN+Down Arrow, SHIFT+TAB, or K |
| Next Point of Interest | Page Up, Tab, or I | FN+UP Arrow, Tab, or I |
| First Point | Home or U | FN+Left Arrow or U |
| Last Point | End or N | Right Arrow or N |
| Move to Origin or Viewport Midpoint | O | O |

Figure 14A:
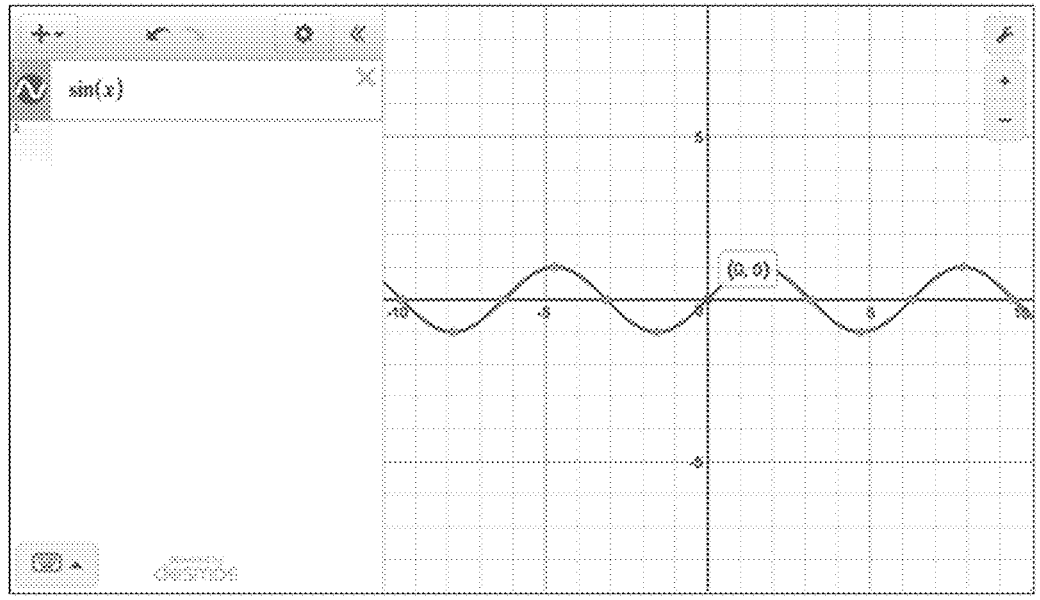
FIG. 14A illustrates an exemplary screenshot of an exemplary expression list user interface with one expression item and a graph shown with an audio tracing function in a first activated state according to an embodiment of the present invention.

When the user enters Audio Trace Mode, a point is shown on either the graph's origin, or if not on screen, the midpoint of the viewport. In this example, the origin is on the screen, so the point (0,0) is selected and played aloud, as shown in FIG. 14A.

Figure 14B:
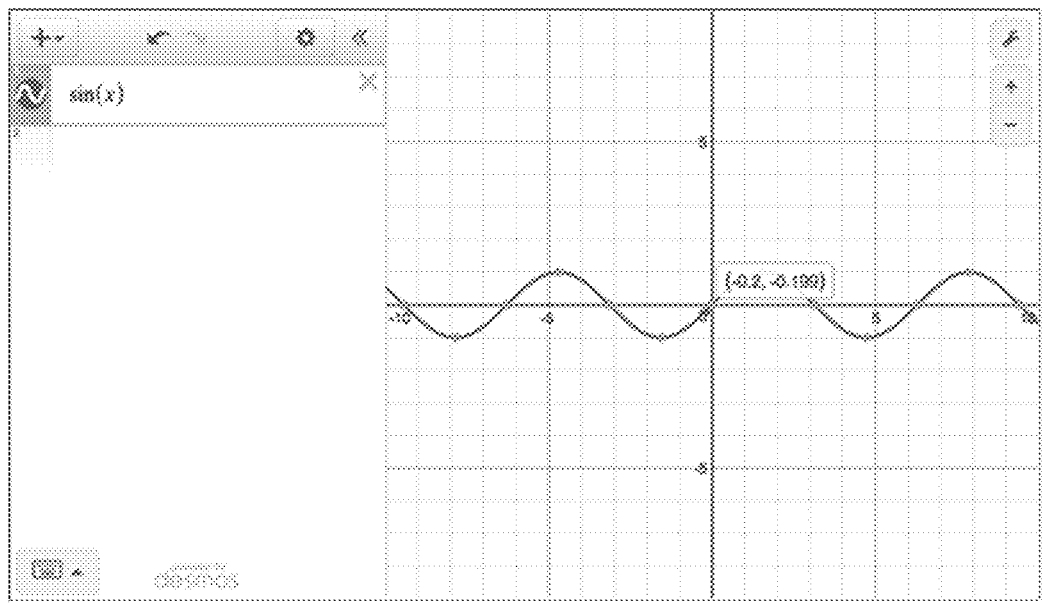
FIG. 14B illustrates an exemplary screenshot of an exemplary expression list user interface with the expression item and graph of FIG. 14A shown with an audio tracing function in a second activated state according to an embodiment of the present invention.

Navigating to the previous point in FIG. 14B, using the keystrokes Left Arrow, Up Arrow, or J on Windows and Mac, the point (−0.2, −0.199) is selected and a lower tone with brown noise is emitted for that point.

Figure 14C:
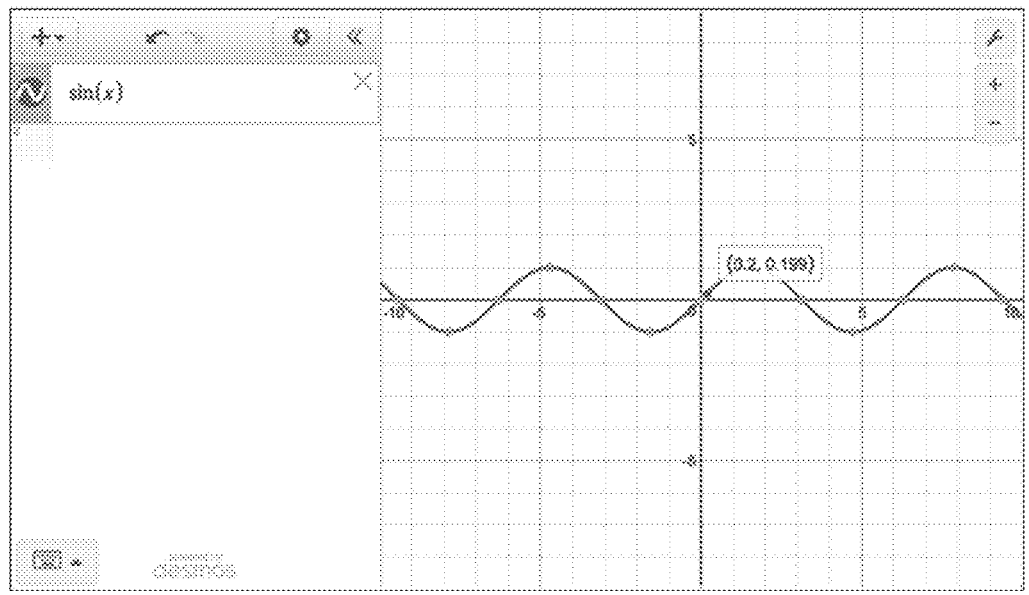
FIG. 14C illustrates an exemplary screenshot of an exemplary expression list user interface with the expression item and graph of FIG. 14A shown with an audio tracing function in a third activated state according to an embodiment of the present invention.

Navigating to the next point in FIG. 14C from the origin using the keystrokes Right Arrow, Down Arrow, or L on Windows and Mac, the next point (0.2, 0.199) is selected and a slightly higher tone is emitted for that point.

Figure 14D:
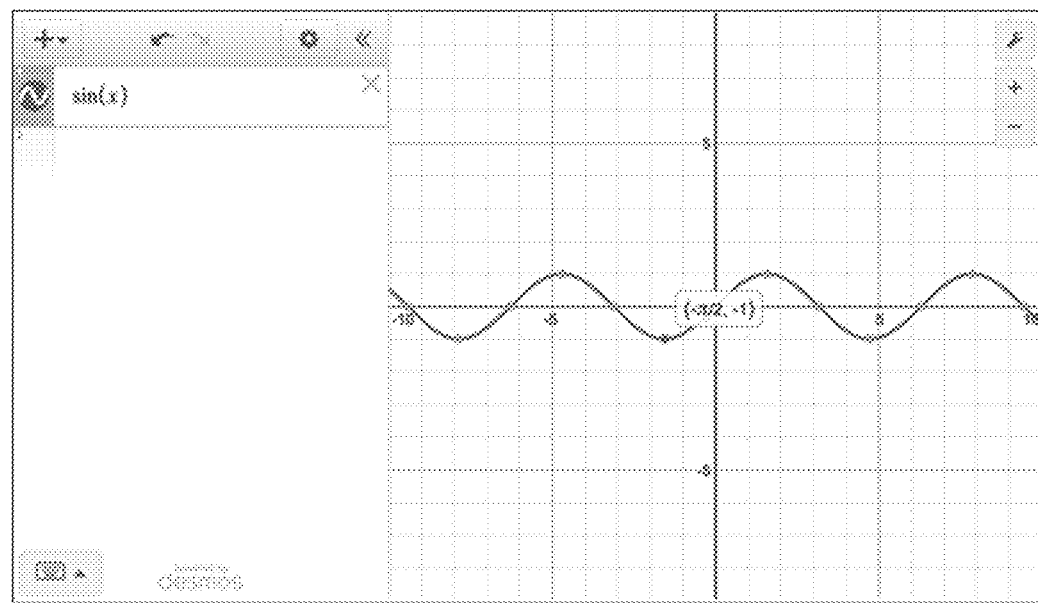
FIG. 14D illustrates an exemplary screenshot of an exemplary expression list user interface with the expression item and graph of FIG. 14A shown with an audio tracing function in a fourth activated state according to an embodiment of the present invention.

Navigating to the previous point of interest in FIG. 14D from the origin using the keystrokes Page Down, Shift+Tab, or K on Windows, Fn+Down Arrow, Shift+Tab, or K on Mac, the previous point of interest (−π/2, −1) is selected and an even lower tone with brown noise is emitted for that point.

Figure 14E:
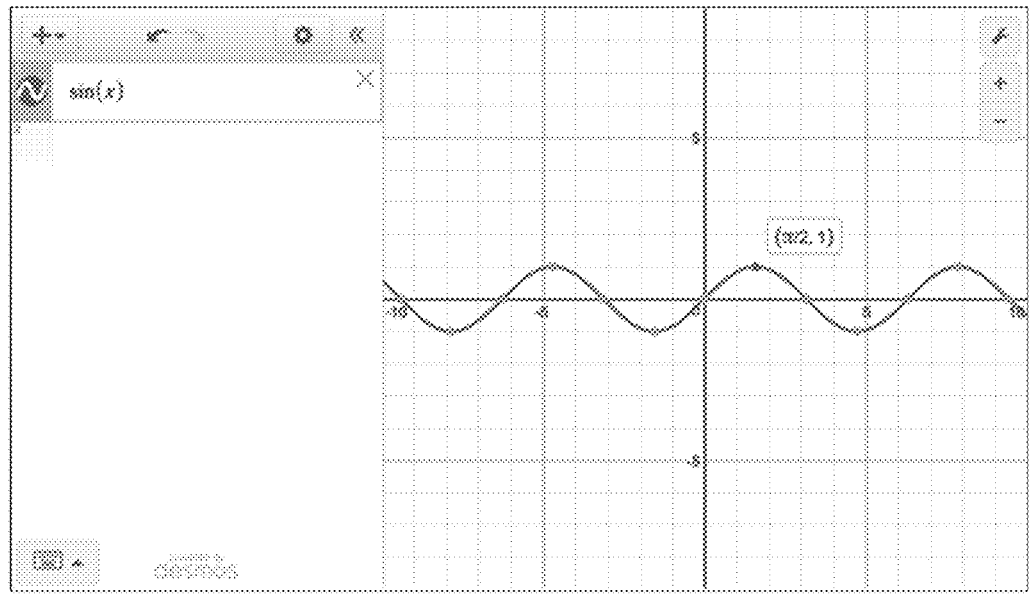
FIG. 14E illustrates an exemplary screenshot of an exemplary expression list user interface with the expression item and graph of FIG. 14A shown with an audio tracing function in a fifth activated state according to an embodiment of the present invention.

Navigating to the next point of interest in FIG. 14E from the origin using the keystrokes Page Up, Tab, or I on Windows, Fn+Down Arrow, Tab, or I on Mac, the next point of interest from the origin, (π/2, 1) is selected and an even higher, also clear tone is emitted for that point.

Figure 14F:
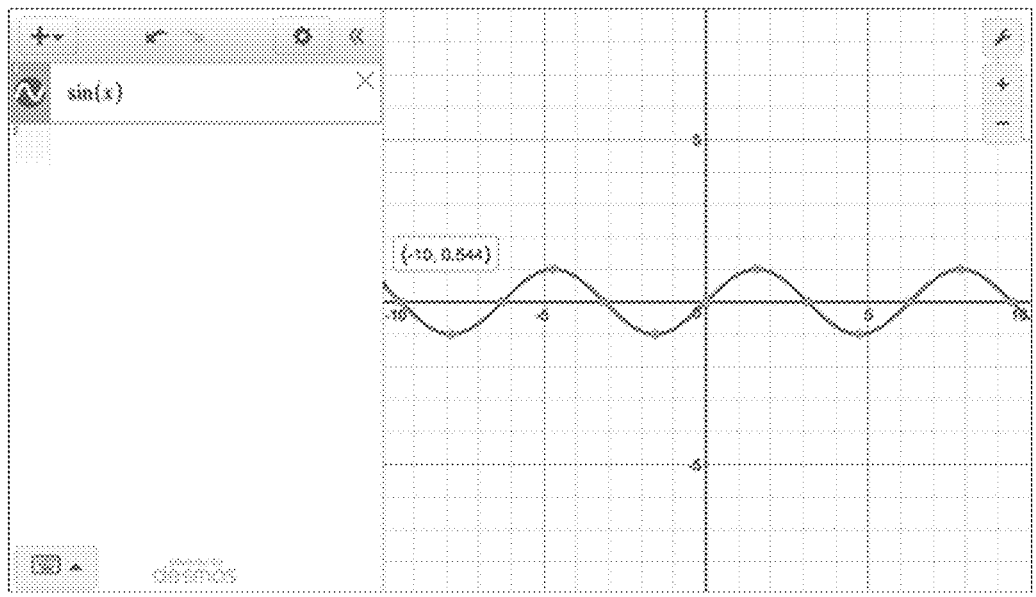
FIG. 14F illustrates an exemplary screenshot of an exemplary expression list user interface with the expression item and graph of FIG. 14A shown with an audio tracing function in a sixth activated state according to an embodiment of the present invention.

Navigating to the first point on the left side of the graph in FIG. 14F using the keystrokes Home or U on Windows, Fn+Left Arrow or U on Mac, the first point of the function shown on the graph (−10, 0.544) is selected and the lowest tone along with another tone an octave higher is emitted for that point.

Figure 14G:
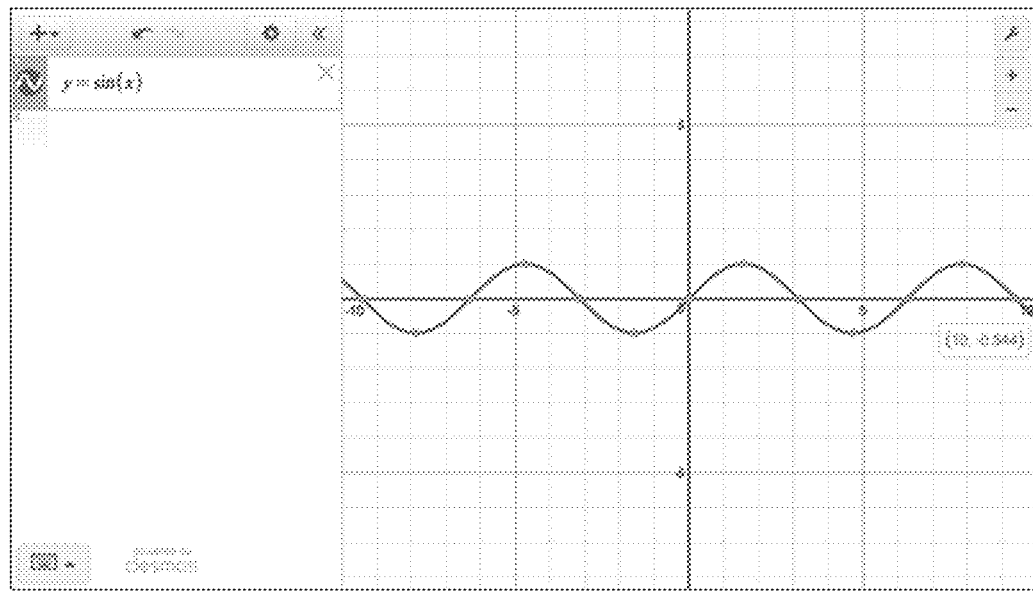
FIG. 14G illustrates an exemplary screenshot of an exemplary expression list user interface with the expression item and graph of FIG. 14A shown with an audio tracing function in a seventh activated state according to an embodiment of the present invention.

Navigating to the last point on the right side of the graph in FIG. 14G using the keystrokes End or N on Windows, Fn+Right Arrow or N on Mac, the last point (10, −0.544) is selected and the highest tone is emitted along with brown noise.

Figure 14H:
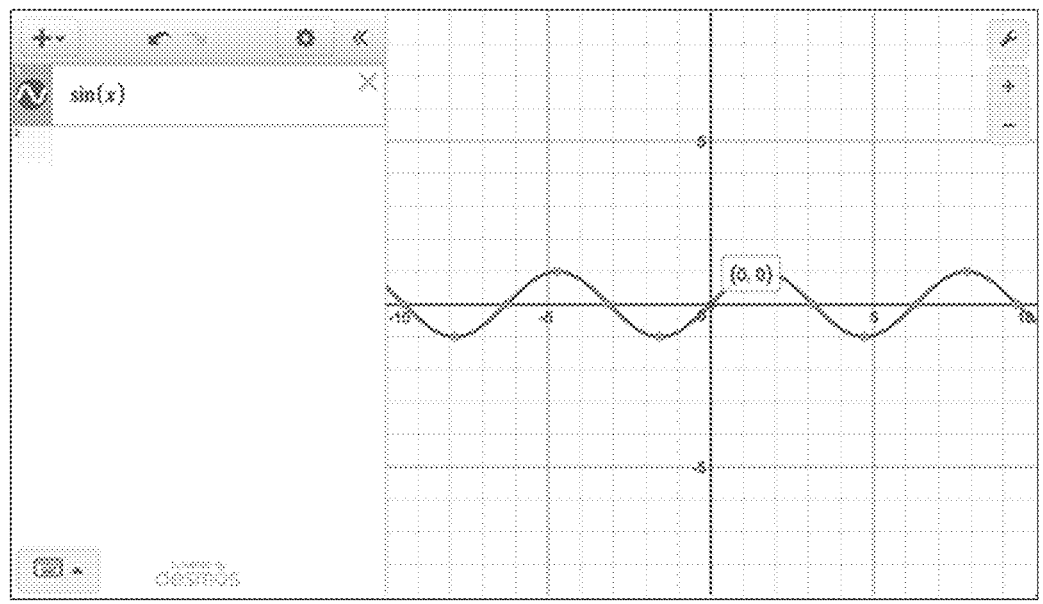
FIG. 14H illustrates an exemplary screenshot of an exemplary expression list user interface with the expression item and graph of FIG. 14A shown with an audio tracing function in an eighth activated state according to an embodiment of the present invention.

Navigating back to the origin or the center of the viewport on the graph in FIG. 14H using the keystroke O on Windows or Mac, the origin point (0,0) is selected and plays the tone for the origin.

Commands also exist in embodiments of the present invention to report coordinates, descriptions, and branch numbers on demand (all of which are properties of each point):

| HOTKEY | PRESS |
| --- | --- |
| Speak X coordinate | X |
| Speak Y coordinate | Y |
| Describe current point (if a POI) | T |
| Speak Branch Number | B |
| Speak Number of POIs | P |
| Announce Active Slider Animations | A |

In some embodiments of the present invention, one may hear an audio representation of either the entire curve or a specific interval, zoom in or out, and adjust playback speed (described in more detail below) with the following commands:

| HOTKEY | Windows | Mac |
| --- | --- | --- |
| Hear Entire Graph | H | H |
| Hear Only Branch 1-10 | 1 through 0 | 1 through 0 |
| Adjust Speed (1 = very slow, 5 = very fast) | ALT+1 through 5 | OPTION+1 through 5 |
| Zoom In | ALT++ | CTRL++ |
| Zoom Out | ALT+− | CTRL+− |
| Restore Zoom | ALT+0 | CTRL+0 |

It is also important to note that each point is computed as the user navigates, so the information conveyed in the audio trace is the most up-to-date, accurate information.

When audio trace is deactivated, the following activities occur:

Any paused sliders are resumed.

The tone generator is placed in a suspended state (to conserve battery power).

A message stating that audio trace is off is spoken.

Figure 14I:
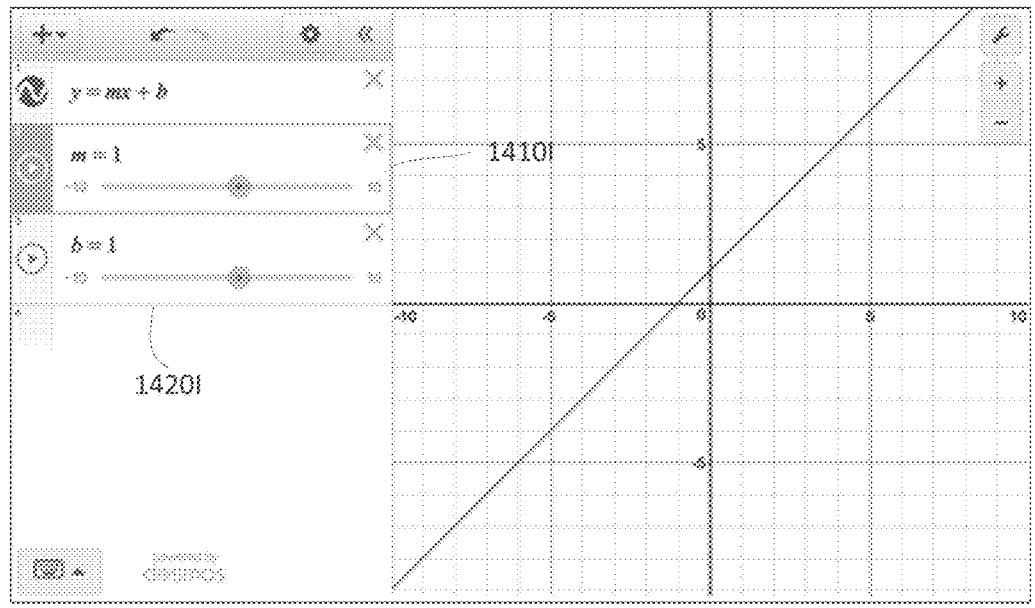
FIG. 14I illustrates an exemplary screenshot of an exemplary expression list user interface with three expression items (including two parameters) and graph shown with a slider in a first position, according to an embodiment of the present invention.
Figure 14J:
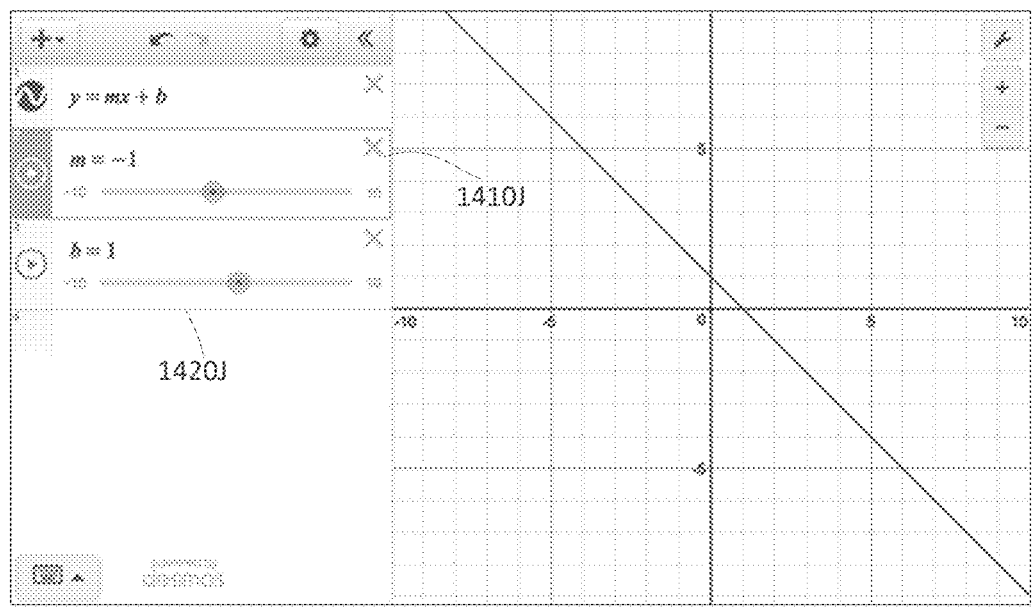
FIG. 14J illustrates an exemplary screenshot of the exemplary expression list user interface of FIG. 14I shown with a slider in a second position.

As discussed above, one advantage which comes as part of the calculator's core pedagogical design is that users can adjust factors of an equation (such as a variable with a slider) and see the effect the change has on the curve. Each variable modification causes the evaluator to pass a message to the grapher to recompute (and thus redraw) the curve, and the audio graph module responds in kind and simultaneously recomputes the value of the selected point. This function is shown in FIGS. 14I and 14J where the calculator includes sliders 1410I and 1410J for variable m, where m=1 on slider 1410I and m=−1 on slider 1410J, and sliders 1420I and 1420J for variable b, where b=1 on slider 1420I and b=1 also on slider 1420J, where all sliders 1410I, 1410J, 1420I, and 1420J have a range from −10 to 10 inclusive.

Because of this simultaneous variable adjustment and graph recomputation and redrawing, the user can be confident that the information he hears as he explores the graph is always accurate, even if the graph is changing due to outside influence. This type of real-time graph updating is not available on previous generations of accessible calculator solutions. With older systems, one must enter an equation, and then request a graph to be played. To change a factor in the equation, the user would modify the typed expression (or rewrite it altogether), and command the device to compute a new graph.

When audio trace is active, and an expression contains adjustable factors available via sliders, one can modify their values to hear what effect the changes have on the current equation with the following commands:

| FUNCTION | Windows | Mac |
| --- | --- | --- |
| Enter and Exit Slider Trace | S | S |
| Increment Slider | Right Arrow or L | Right Arrow or L |
| Decrement Slider | Left Arrow or J | Left Arrow or J |
| Increment Slider by Larger Value | Page Up | FN+Up Arrow |
| Decrement Slider by Larger Value | Page Down | FN+Down Arrow |
| Move to Slider Minimum | Home | FN+Left Arrow |
| Move to Slider Maximum | End | FN+Right Arrow |
| Move to Previous Slider | Up Arrow or I | Up Arrow or I |
| Move to Next Slider | Down Arrow or K | Down Arrow or K |
| Play or Pause Current Slider | P | P |

For example, take the classic equation for a line: y=mx+b. When audio trace is active, enter slider trace by pressing S, and note that the value of m is set to 1. Pressing H yields an ascending tone which pans from left to right, indicating a line with a positive slope. Next, press the Left Arrow twice until m is −1. Pressing H again now results in a descending tone panning from left to right, indicating a line with negative slope.

One can also animate one or more sliders by selecting them with the Up and Down Arrow keys and pressing P to play or pause them. In a preferred embodiment of the present invention, if any sliders are animating during slider trace, a tone representing the currently selected point will sound and change as the point updates on screen.

Audio playback can be categorized as either single or multi-point. In the single-point system, a newly selected point is sent to the tone generator for immediate translation and playback at a duration of 50 ms. Selection can be performed either by moving the point with the Arrow keys or by tracing the curve with the mouse.

Figure 15:
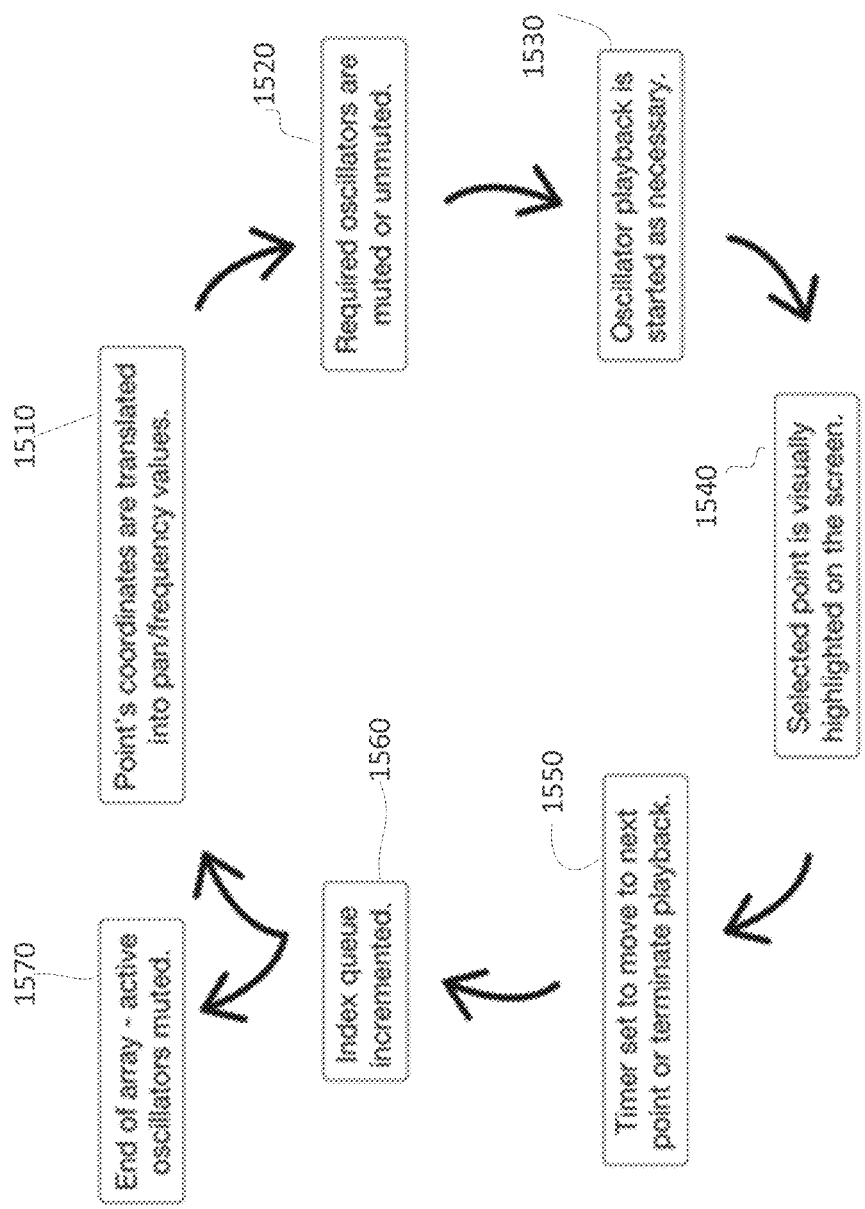
FIG. 15 illustrates an exemplary flowchart depicting a method of activating a single or multi-point audio playback according to an embodiment of the present invention.

In the multi-point system, invoked when the user presses H to hear the graph or the numbers 1 through 0 to play the respective branches 1 through 10, the audio graph module calculates an array of all navigable points and passes them to the tone generator for playback. Each time a point is played, the following activities occur, as shown in the diagram of FIG. 15:

In step 1510, the point's coordinates are translated into pan/frequency values. Each point contains a property called "graph mode," which is assigned by the evaluator and describes the type of graph being computed. At the time of writing the tone generator understands two graph modes: GRAPHMODE.Y (where Y is the dependent variable and X is its dependent counterpart), and GRAPHMODE.X (where the inverse is true). The pitch of the primary oscillator is computed based on the point's position within the total range of the visible axis multiplied against a base frequency of 500 hz. Similarly, the left-to-right pan value of the independent portion of the point is scaled to the visible portion of the independent axis and assigned a value ranging from −1 (hard left), 0 (center), and 1 (hard right).

In step 1520, required oscillators are muted or unmuted, depending on the values of the dependent and independent variables (see above for details)

| Condition | Primary Triangle | Secondary Triangle | Brown Noise |
| --- | --- | --- | --- |
| Independent < 0 | On | On | X |
| Independent > 0 | On | Off | X |
| Dependent < 0 | On | X | On |
| Dependent > 0 | On | X | Off |
| Discontinuity or Off-Screen | Off | Off | On |

In step 1530, oscillator playback is started as necessary.

Figure 15A:
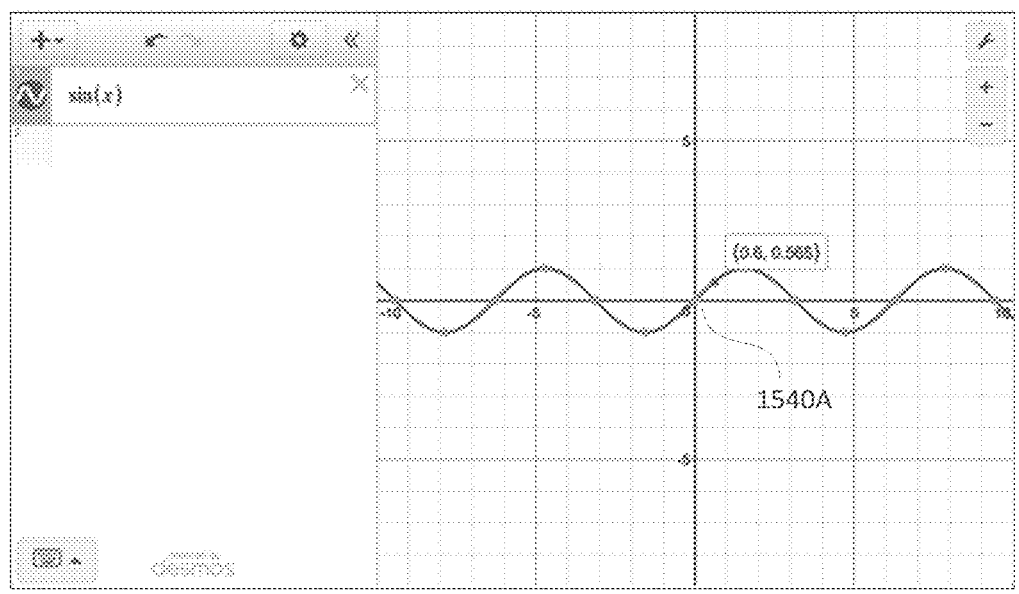
FIG. 15A illustrates an exemplary screenshot of an exemplary expression list user interface that may be used in the method shown in FIG. 15.

In step 1540, the selected point is visually highlighted on screen. This is shown at point 1540A of FIG. 15A.

In step 1550, a timer is set to either move to the next point in the queue or terminate playback. The timer's duration ranges between 12 and 150 ms (dependent on the playback speed selected by the user).

In step 1560, the index of the queue is incremented.

In step 1570, playback continues as described until the end of the array is reached, at which point active oscillators are muted.

Although playing and synchronizing a series of graph points has been done for specialized applications and hardware (including the Orion TI-84 Plus Talking Graphing Calculator, ViewPlus Accessible Graphing Calculator for Windows-based computers, and the Graph-It program for the Braille 'N Speak note taker), no web-based calculator application has developed such audio navigation and playback capabilities for mobile and other networked computing devices. Embodiments of the present invention described in this specification encompass accessibility standards and criteria provided by WAI-ARIA and HTML 5 audio synthesis. Compared to traditional cross-platform development efforts, embodiments of the present invention allow the same code to run on all supported devices with minimal modification and configuration as described in this specification. Furthermore, embodiments of the present invention that feature compliance with the active and relatively new technologies of the WAI-ARIA and HTML 5 web audio standards create an innovative, screen reader accessible, interactive, cross-platform mathematical graphing calculator tool.

When audio tracing, the user moves in equal increments and receives audible feedback scaled to the active viewport at each point, thus providing an accurate picture of the graph's appearance. Note: further details are given in the previous section.

For example, a basic parabola such as $y=x^2$ is audibly represented as a continuous tone whose pitch increases, decreases, and increases again. A curve which contains discontinuous sections, on the other hand, such as $y=\sin(\sqrt{x})$ is represented as an increasing and decreasing tone interrupted periodically by static (indicating no computed value).

While previous generations of audio graphing systems are capable of representing continuous curves (such as the parabola), they cannot interpret discontinuous equations and will often times throw errors or entirely skip the non-evaluable points.

When listening to a curve, static is heard alongside the tone when the dependent variable is less-than 0, and an overtone one octave above plays when the independent is less-than 0. A brief "pop" will sound when an intersection is reached. These cues provide additional points of orientation to the audible graph user.

Static+graph tone=dependent less than 0
Overtone+graph tone=independent less than 0
Pop=POIs designated as intersections
Static=function undefined in that region In some embodiments of the present invention, the audio trace of the graph plays static to indicate the dependent variable is less-than 0, similar to prior graphing calculator applications (for example, the ViewPlus Accessible Graphing Calculator). Thus, if a user listens to audio playback without the benefit of headphones or stereo speakers, she could gauge whether the current point is above or below the Y axis, but nothing more. The method in which embodiments of the present invention modify the tone itself when the independent variable is less-than 0, however, provide an advantage of being able to convey complete information about a point's quadrant, and thus refine the user's understanding of the graph layout. In addition, other systems do not audibly indicate intersections which is done by embodiments of the present invention.

As one moves between points, the X/Y coordinates are spoken, along with a description of the point (if a POI), and the point's branch number (if a new branch has been selected). Individual properties of a point can be accessed on demand with intuitive commands such as X to speak the X coordinate, Y to speak the Y coordinate, B to voice the branch number, and T to describe the type of point (intercept, maximum, minimum, or intersection). Unlike known graphing calculators in the prior art, the audio trace system described above as implemented in embodiments of the present invention allow one to move through points of a graph in real-time.

Along with providing interactive graph exploration, the user can also request that a verbal graph summary be provided without requiring the need to enter audio trace mode by pressing ALT+S (or OPTION+S on a Mac) when the focused expression has a graph The verbal graph summary information includes details such as the number of branches, points of interest, and their locations (given as X/Y coordinate pairs). This summary information implemented in embodiments of the present invention, unlike previous generations of graphing calculators, provide these metrics on demand.

In some embodiments of the present invention, a Braille translation system, also known as Abraham, may be used to translate mathematical expressions entered by a user in a typeset format (such as LaTeX) to Braille and vice versa in certain supported environments, set forth below:

The translation system itself functions on any device capable of executing JavaScript code. For practical applications which also accept and deliver input and output from and to a user, the following device and operating system combinations have been used in embodiments of the present invention:

Windows: Chrome 50+ and Firefox 50+ with the JAWS for Windows and NVDA screen readers The Android-based BrailleNote Touch tablet by HumanWare iOS: 10.x and below is not supported because the operating system does not transmit input to Safari webviews consistently, and display output shows too much additional information to make typing on units containing less than 32 cells practical. iOS 11 shows potential as it resolves these problems.

macOS: 10.12 and earlier is not supported because Safari displays unrelated information on the Braille display each time a keystroke is typed, requiring the user to scroll at least twice to review his input. Furthermore, the scroll position is lost with subsequent keystrokes. Version 10.13 resolves the problem of showing unrelated information on the display, and the operating system is better able to track braille input.

For the above devices used in embodiments of the present invention, the user should disable any active translator or change the input and output translation tables to computer Braille to ensure that the device does not attempt to interpret user input as contracted literary Braille. The methods to activate computer Braille mode used in some embodiments of the present invention are documented on the Desmos accessibility page at https://www.demos.com/accessibility/. Teachers and students using the Braille translation system used in embodiments of the present invention may use any Braille display that the above screen readers support.

Design Overview

The Abraham Braille translation system set forth in embodiments of the present invention is written in a combination of standard JavaScript, a superset known as TypeScript (https://www.typescriptlang.org/) which enforces type safety, and JISON (https://zaa.ch/jison/), which is a JavaScript-compatible system for designing language parsers based on syntax similar to FLEX/BISON (used in compiler construction).

Components

Abraham defines rules for understanding three languages: LaTeX, Nemeth, and UEB. Each language consists of the following components:

Language tree: defines methods which represent major language components and returns their values, e.g. terminals (individual letters), commands, fractions, levels (primes, subscripts, and superscripts), radicals, etc. When parsing LaTeX, an additional normalization step (handled in the normalize-latex-tree module) is performed to remove unnecessary information (such as empty levels), delete meaningless commands (such as '\\'), and rewrite invalid commands to their proper typeforms (such as '\ mod' to '\operatorname{mod}'.

Lexer/parser: a grammar written in JISON transforming a string of input into a tree of traversable tokens. For Nemeth and UEB, one can opt for strict or permissive parsing (described more below).

Printer: accepts a parsed tree as input, and returns a string translation as output.

An example Printer Data Flow from LaTeX to Nemeth for LaTeX input: y=\ sin(x) used in some embodiments of the present invention is as follows:

After running through JISON parser, an initial LaTeX tree becomes:

```
[ { type: 'terminal', value: 'y' },
  { type: 'terminal', value: '=' },
  { type: 'command', value: '\\sin' },
  { type: 'terminal', value: '(' },
  { type: 'terminal', value: 'x' },
  { type: 'terminal', value: ')' } ]
```

The initial LaTeX tree is then normalized to:

```
[ { type: 'terminal', value: 'y' },
  { type: 'terminal', value: '=' },
  { type: 'command', value: '\\sin' },
  { type: 'terminal', value: '(' },
  { type: 'terminal', value: 'x' },
  { type: 'terminal', value: ')' } ]
```

Tree with 6 nodes is passed to printer
Printer Processes item {type: 'terminal', value: 'y'}
Output value becomes Y
Printer processes item {type: 'terminal', value: '='}
Output value becomes Y .K
Printer processes item {type: 'command', value: '\\ sin'}
Output value becomes Y .K SIN
Printer processes item {type: 'terminal', value: '('}
Output value becomes Y .K SIN (
Printer processes item {type: 'terminal', value: 'x'}
Output value becomes Y .K SIN (X
Printer processes item {type: 'terminal', value: ')'}
Output value becomes Y .K SIN (X)
Printing completes.
UNICODE Braille module changes ASCII input Y .K SIN (X) to UNICODE Braille ⠽ ⠅ ⠎⠊⠝ ⠷⠭⠾
UNICODE Braille is returned as result's value.

An example Printer Data Flow from Nemeth to LaTeX used in some embodiments of the present invention, for the below UNICODE Braille input is as follows:
UNICODE Braille: ⠽ ⠅ ⠎⠊⠝ ⠷⠭⠾
UNICODE Braille module changes UNICODE ⠽ ⠅ ⠎⠊⠝ ⠷⠭⠾ to ASCII Y .K SIN (X)
After parsing Nemeth string, initial JISON parsed tree becomes:

```
{ value:
  [ { type: 'terminal', value: 'y' },
    { type: 'comparison', value: '=' },
    { type: 'command', value: '\\sin ' },
    { type: 'terminal', value: ' ' },
    { type: 'terminal', value: '(' },
    { type: 'terminal', value: 'x' },
    { type: 'terminal', value: ')' } ],
  warnings: [ ] }
```

Value is passed to printer.
Printer begins processing the tree with 7 nodes.
Printer processes item {type: 'terminal', value: 'y'}
Output value becomes y
Printer processes item {type: 'comparison', value: '='}
Output value becomes y=
Printer processes item {type: 'command', value: '\\ sin'}
Output value becomes y=\ sin
Printer processes item {type: 'terminal', value: ' '}
Output value becomes y=\ sin
Printer processes item {type: 'terminal', value: '('}
Output value becomes y=\ sin \left(
Printer processes item {type: 'terminal', value: 'x'}
Output value becomes y=\ sin \left(x
Printer processes item {type: 'terminal', value: ')'}
Output value becomes y=\ sin \left(x\right)
Printer completes processing and returns y=\ sin \left(x\right)

Another example Printer Data Flow from LaTeX to UEB used in some embodiments of the present invention, for the LaTeX input y=\ sin(x) is as follows:
Parser returns JISON tree:

```
[ { type: 'terminal', value: 'y' },
  { type: 'terminal', value: '=' },
  { type: 'command', value: '\\sin' },
  { type: 'terminal', value: '(' },
  { type: 'terminal', value: 'x' },
  { type: 'terminal', value: ')' } ]
```

Tree is passed to normalize LaTeX module which returns:

```
[ { type: 'terminal', value: 'y' },
  { type: 'terminal', value: '=' },
  { type: 'command', value: '\\sin' },
  { type: 'terminal', value: '(' },
  { type: 'terminal', value: 'x' },
  { type: 'terminal', value: ')' } ]
```

Normalized tree is passed to printer.
Printer processes tree with 6 nodes.
Printer processes item {type: 'terminal', value: 'y'}
Output value becomes Y
Printer processes item {type: 'terminal', value: '='}
Output value becomes Y"7
Printer processes item {type: 'command', value: '\\ sin'}
Output value becomes Y"7 SIN"<
Printer processes item {type: 'terminal', value: '('}
Output value becomes Y"7 SIN"<
Printer processes item {type: 'terminal', value: 'x'}
Output value becomes Y"7 SIN"<X
Printer processes item {type: 'terminal', value: ')'}
Output value becomes Y"7 SIN"<X">
Processing completes.
UNICODE Braille module changes ASCII input Y"7 SIN"<X"> to UNICODE Braille: ⠽⠐⠶⠎⠊⠝⠐⠣⠭⠐⠜
UNICODE output is returned as value property of result object.

Another example Printer Data Flow from UEB to LaTeX for the UEB input listed below is as follows:
UNICODE UEB: ⠽⠐⠶⠎⠊⠝⠐⠣⠭⠐⠜
UNICODE Braille module changes UNICODE Braille input of ⠽⠐⠶⠎⠊⠝⠐⠣⠭⠐⠜ to ASCII output Y"7 SIN"<X">
JISON parser returns tree:

```
{ value:
  [ { type: 'terminal', value: 'y' },
    { type: 'terminal', value: '=' },
    { type: 'command', value: '\\sin' },
    { type: 'terminal', value: ' ' },
```

-continued

```
{ type: 'terminal', value: '(' },
{ type: 'terminal', value: 'x' },
{ type: 'terminal', value: ')' } ],
warnings: [ ] }
```

Printer begins processing tree with 7 nodes.
Printer processes item {type: 'terminal', value: 'y'}
Output value becomes y
Printer processes item {type: 'terminal', value: '='}
Output value becomes y=
Printer processes item {type: 'command', value: '\\ sin'}
Output value becomes y=\ sin
Printer processes item {type: 'terminal', value: ' '}
Output value becomes y=\ sin
Printer processes item {type: 'terminal', value: '('}
Output value becomes y=\ sin \left(
Printer processes item {type: 'terminal', value: 'x'}
Output value becomes y=\ sin \left(x
Printer processes item {type: 'terminal', value: ')'}
Output value becomes y=\ sin \left(x\right)
Processing completes, and output is returned as value property of result object.

Other Components

In addition to each language-specific item, the translator relies on the following general components in embodiments of the present invention:

Index: defines the library entry point and encapsulates all user-accessible translation methods
  Auto Operator Module: analyzes a Nemeth or UEB tree for the presence of LaTeX operator names (described in more detail below)
  Format JISON Error module: used to return errors in a specific form in the event of programming or parsing errors
  Result: defines the data object for a strictly parsed string
  Result with Warning: defines the data object for a permissively parsed string
  Unicode Braille: includes methods for converting between ASCII
  Computer Braille and UNICODE Braille Patterns
  Abraham font: used in some embodiments of the present invention for display of six dot Braille cells. One useful property of this font is that it maps any of the three Braille Cell encodings (Unicode, Braille ASCII, and Expanded Braille ASCII) to the same glyphs. For example, the strings "abc", "ABC", and "⠁⠃⠉" will render identically visually as they naturally would on a connected Braille display. Using a custom font also enables the visual presentation of the Braille glyphs to remain consistent across operating system and web browser combinations.

General Translation Pipeline

At a high level, the Braille translator used in embodiments of the present invention expects a string to translate along with a set of optional parameters which effect translation. Output is a data object containing value and warnings parameters, or an error parameter (described below).

Example Input and Optional Parameters

```
Abraham.nemethToLatex('⠑⠰⠆⠋⠠⠄⠭⠘⠆') // returns { value:
'e_{f}^{x^{2}}', warnings: [ ] }
Abraham.latexToNemeth('e_{f}^{x^{2}}') // returns { value:
'⠑⠰⠆⠋⠠⠄⠭⠘⠆' }
Abraham.uebToLatex('⠂⠬⠂') // returns { value: '1+1',
warnings: [ ] }
Abraham.latexToUeb('1+1') // returns { value: '⠂⠬⠂' }
Abraham.nemethToLatex('⠂⠌⠆', {strict: true})
// returns { error:
//     { location: { first_line: 1, last_line: 1, first_column:
3, last_column: 4 },
//         /* ... */
// }
```

Note: the "strict" parameter defines whether the library preprocesses input using a permissive lexer. The permissive lexer attempts to add opening and closing symbols to otherwise invalid Braille input. The permissive lexer will be used automatically unless the user supplies {strict: true} as part of the second options parameter. In some embodiments of the present invention, strict or permissive lexing applies when translating Braille codes to LaTeX as the calculator component already utilizes the basic LaTeX correctness checking which is part of the MathQuill open-source component provided in some embodiments of the present invention.

When translating Braille to LaTeX, the user may also supply a list of keywords which, when encountered, will be written as LaTeX operator names. For example:

```
Abraham.nemethToLatex('BLAH(ABC)', {operatorNames: ['blah']});
// returns { value: '\\operatorname{blah}(abc)' }
```

More details regarding LaTeX operator names, as well as the list of default keywords, are described in the "Public API" section below.

Nemeth/UEB to LaTeX

Index passes input and options to parser
  If permissive parameter exists, call permissive lexer. If strict exists, call strict lexer.
  Use list of LaTeX operator names if passed; otherwise fall back to defaults. Operator names are discussed in more detail below in the "public API" section.
  Input is passed to the appropriate lexer/parser.
  Lexer/parser returns a tree of parsed nodes or an error.
  If tree is returned, index passes it to printer.
  Printer returns a string or an error (if unknown item was passed, e.g. unknown symbol).
  Index returns value of printer output along with any warnings (when permissive lexer was selected).

Example with Permissive Lexing

Calling Abraham.nemethToLatex('⠂⠌⠆');
  Index assumes permissive lexing, and replaces the default (strict) JISON lex( ) method with the version found in the permissive Nemeth lexer module.
  JISON produces list of tokens (names defined as constants within the JISON grammar file):
  [START_FRACTION, NUMBER, SLASH, NUMBER]
  Permissive lexer scans the START_FRACTION token and pushes it to the list of open delimiters.
  Permissive lexer scans the NUMBER token and continues.
  Permissive lexer scans the SLASH token and pushes it to the list of open delimiters.
  Permissive lexer scans the NUMBER token and continues.

Permissive lexer reaches the EOF (end of input) token and looks for unmatched starting or ending delimiters.

Lexer finds a slash from a fraction and pushes a CLOSE_FRACTION token and a warning to the result object.

Lexing completes, and JISON calls the parse method.

Parse completes and returns a parsed tree to the index module:

```
{ type: 'fraction',
    numerator: [ { type: 'terminal', value: '1' } ],
    denominator: [ { type: 'terminal', value: '2' } ] }
        warnings: [ { location: [Object] } ] } // see public
API section below for all warnings field information
```

Parsed tree is passed to printer.
Printer processes item:

```
{ type: 'fraction',
    numerator: [ { type: 'terminal', value: '1' } ],
    denominator: [ { type: 'terminal', value: '2' } ] }
```

Print fraction method is called, which in turn calls the printer for numerator and denominator values separately.

Printer processes item {type: 'terminal', value: '1'} and returns 1

Printer processes item {type: 'terminal', value: '2'} and returns 2.

Printing of numerator and denominators completes.

Print fraction method returns \frac{1}{2}

Initial print group method completes and returns the fraction to the index module.

Having received a value, the index module returns a result object to the caller with the fraction as the value property, and the permissive lexer warnings in the warnings property.

Example with Strict Lexing

Calling Abraham.nemethToLatex(' ⠹⠂ ⠌⠒ ', {strict: true}); // note: this is an incomplete fraction and will not parse Index honors the option for strict lexing, and does not replace the JISON lex( ) method.

Index calls the JISON parser.

JISON produces list of tokens (names defined as constants within the JISON grammar file):

[START_FRACTION, NUMBER, SLASH, NUMBER]

Lexing completes, and JISON calls the parse method.

Parsing fails, and JISON returns an error to the index module.

Index module returns the following object to the caller:

```
{ error:
    { _diagnostic:
        { expected: [Object],
            message: 'Parse error on line 1:\n?1/2\n----
            \nExpecting \'CLOSE_FRAC\', got \'EOF\'',
            text: '',
            token: 'EOF' },
        location: { first_line: 1, last_line: 1, first_column: 3,
        last_column: 4 } } }
```

Note: if a complete fraction was passed to nemethToLatex( ), the parsing and printing steps would be identical to permissive lexing except that the default JISON lex( ) method would be used.

LaTeX to Nemeth/UEB

Index passes input and options to parser

Use list of LaTeX operator names if passed; otherwise fall back to defaults. Operator names are discussed in more detail below in the "Public API" section.

Input is passed to the LaTeX lexer/parser.

Lexer/parser returns a tree of parsed nodes or an error.

If tree is returned, index passes it to normalize LaTeX tree module to ensure the LaTeX passed to the translators is well-formed.

Index passes normalized LaTeX tree to printer.

Printer returns a string or an error (if unknown item was passed, e.g. unknown symbol).

Index returns value of printer output.

Example LaTeX to Nemeth Data Flow

Calling Abraham.latexToNemeth('y=\\ sin(x)'); // note the \ must be escaped

Index module calls the JISON parser which lexes the input to create a series of tokens (constants are defined in the JISON grammar):

[TERMINAL, EQUALITY, COMMAND, OPEN_BRACKET, TERMINAL, CLOSE_BRACKET]

JISON parses the list of tokens and returns the following parsed tree:

```
[ { type: 'terminal', value: 'y' },
    { type: 'terminal', value: '=' },
    { type: 'command', value: '\\sin' },
    { type: 'terminal', value: '(' },
    { type: 'terminal', value: 'x' },
    { type: 'terminal', value: ')' } ]
```

LaTeX tree is normalized to:

```
[ { type: 'terminal', value: 'y' },
    { type: 'terminal', value: '=' },
    { type: 'command', value: '\\sin' },
    { type: 'terminal', value: '(' },
    { type: 'terminal', value: 'x' },
    { type: 'terminal', value: ')' } ]
```

Tree with 6 nodes is passed to printer

Printer Processes item {type: 'terminal', value: 'y'}

Output value becomes Y

Printer processes item {type: 'terminal', value: '='}

Output value becomes Y .K

Printer processes item {type: 'command', value: '\\ sin'}

Output value becomes Y .K SIN

Printer processes item {type: 'terminal', value: '('}

Output value becomes Y .K SIN (

Printer processes item {type: 'terminal', value: 'x'}

Output value becomes Y .K SIN (X

Printer processes item {type: 'terminal', value: ')'}

Output value becomes Y .K SIN (X)

Printing completes.

UNICODE Braille module changes ASCII input Y .K SIN (X) to UNICODE Braille: ⠽ ⠨⠅ ⠎⠊⠝ ⠷⠭⠾

UNICODE Braille is returned as result's value.

Public API

Abraham can be referenced as either a universal JavaScript Module (UMD) or as a global object.

If using the UMD form:

```
// assuming current working directory is the root of the
Abraham project:
var Abraham = require('./build/abraham');
```

Translating Nemeth to and from LaTeX:

```
Abraham.nemethToLatex('⠅⠼⠋⠘⠭⠘⠼⠃⠄') // returns { value:
'e_{f}^{x^{2}}', warnings: [ ] }
Abraham.latexToNemeth('e_{f}^{x^{2}}') // returns { value:
'⠅⠼⠋⠘⠭⠘⠼⠃⠄' }
```

Translating UEB to and from LaTeX:

```
Abraham.uebToLatex('⠼⠁⠐⠖⠼⠁') // returns { value: '1+1',
warnings: [ ] }
Abraham.latexToUeb('1+1') // returns { value: '⠼⠁⠐⠖⠼⠁' }
``` nemethToLatex and uebToLatex expect their input to be six-dot Unicode Braille Characters.

nemethToLatex, latexToNemeth, uebToLatex, and latexToUeb return Result objects, which either have a value property, or an error property.

The value property of latexToNemeth and latexToUeb Result is a Unicode Braille String, and the value property of latexToNemeth and latexToUeb Result is a LaTeX string.

When a parse error occurs, the error property of the Result of these methods gives the location of the place where the error occurred in the following format:

```
{ error:
  { location: { first_line: 1, last_line: 1, first_column: 0,
    last_column: 1 }}
```

The error property also has an _diagnostic field with information that's useful for developers for understanding parse errors, but the contents of this property may change and are not part of the public API.

Strict and Permissive Translation

By default, nemethToLatex and uebToLatex will insert missing delimiters like open or close fraction symbols, and open or close radical symbols. This is useful because it allows translating to LaTeX as a user types, even before the expression is complete, and also because users may sometimes make mistakes in entering these delimiters.

The result of nemethToLatex and uebToLatex has a warnings property that lists each location at which a missing delimiter was inserted.

For example, the following input is missing a "close fraction" symbol:

```
Abraham.nemethToLatex('⠼⠁⠌⠼⠃')
// returns { value: "\\frac{1}{2}",
//   warnings: [
//     { location: { first_line: 1, last_line: 1,
first_column: 4, last_column: 4 } }
//   ]
// }
```

This behavior can be disabled (in which case missing delimiters will become a parse error) by passing {strict: true} as a second argument to the translators.

```
Abraham.nemethToLatex('⠼⠁⠌⠼', {strict: true})
// returns { error:
//   { location: { first_line: 1, last_line: 1,
first_column: 3, last_column: 4 },
//     /* ... */
// }
```

LaTeX Operator Names

LaTeX includes the \operatorname keyword to allow a user to define custom commands. Embodiments of the present invention use this ability to define functions which users can input, even if they are not part of the limited LaTeX standard. For example, a user could write y=sin(x) (which is valid LaTeX), or y=arcsin(x) (which is technically not valid LaTeX). MathQuill transforms the second example to y=\operatorname{arcsin}(x), which is valid LaTeX.

Because neither Nemeth nor UEB do not define an analogous syntax for custom function names, only the value of the custom \operatorname is printed when translating LaTeX into Braille. For example:

```
Abraham.latexToNemeth('\\operatorname{floor}(x)'); //
returns { value: '⠋⠇⠕⠕⠗⠷⠭⠾' } AKA FLOOR (X)
```

In order to translate operator names from Braille to LaTeX, the Braille translator disclosed in embodiments of the present invention uses a list of expected operators to watch for. An extensive list encompassing values used in the calculator program set forth in embodiments of the present invention is included with the library. Developers can overwrite the internal definitions with their own by adding the operatorNames property to the options parameter passed to the translator. The translator expects this value to be an array of strings.

```
Abraham.nemethToLatex('BLAH(ABC)', {operatorNames:
['blah']}); // returns { value: '\\operatorname{blah}(abc)' }
```

Default Operator Names
abs(x)—absolute value
arccosh(x)—hyperbolic arc-cosine
arccot(x)—arc-cotangent
arccoth(x)—hyperbolic arc-cotangent
arccsc(x)—arc-cosecant
arccsch(x)—hyperbolic arc-cosecant
arcsec(x)—arc-secant
arcsech(x)—hyperbolic arc-secant
arcsinh(x)—hyperbolic arc-sine
arctanh(x)—hyperbolic arc-tangent
ceil(x)—ceiling
corr(x1, x2)—Pearson correlation coefficient of two lists
cov(x1)—covariance
csch(x)—hyperbolic cosecant
distance
floor(x)
gcd—greatest common divisor
gcf—greatest common factor
lcm—lowest common multiplier
length(x1)—number of elements in a list
mad(x1)—mean absolute deviation
max(x1)
mcd—international alias for greatest common denominator
mcm—international alias for least common multiple mean(x1)
median(x1)
midpoint(x1)
min(x1)
mod(a,b)—modulus
nCr(n, r)—number of combinations
nPr(n, r)—number of permutations
quantile
round(x)
sech(x)—hyperbolic secant
sign(x)
signum(x)—sign (positive or negative)
stddev(x1)—standard deviation
stddevp(x1)—standard deviation of population
stdDev(x1)—alias for standard deviation
stdDevP(x1)—standard deviation of population
stdev(x1)—alias for standard deviation
stdevp(x1)—alias for standard deviation of population
total(x1)—sum of all elements in a list
var(x1)—variance
variance(x1)—variance
varp(x1)—variance of population Braille Cell Encodings There are also methods for translating between Braille ASCII (a cell-by-cell encoding of six dot Braille cells into a subset of ASCII), and Unicode Braille cell characters:

```
var UnicodeBraille = Abraham.UnicodeBraille;
UnicodeBraille.toBrailleAscii('⠨⠁ ⠼⠋⠠⠁') // returns '#A"6#A'
UnicodeBraille.toExpandedBrailleAscii('⠨⠁ ⠼⠋⠠⠁') // returns '#a"6#a'
UnicodeBraille.coerceToSixDotCells('#A"6#A') //returns
'⠨⠁ ⠼⠋⠠⠁'
```

Expanded Braille ASCII is a similar encoding to Braille ASCII intended for eight dot Braille cells (very common on electronic Braille displays such as the HumanWare BrailleNote Touch). A primary difference is that it encodes both upper case and lower case letters as single Braille cells (in Braille ASCII, upper case letters are represented with digraphs: a comma followed by a letter).

UnicodeBraille.coerceToSixDotCells is useful for taking input in a variety of formats and coercing it to six-dot Unicode Braille characters that the translator natively understands. It will convert either Braille ASCII or Expanded Braille ASCII (ignoring case) to six dot Unicode Braille characters, and will also convert any eight dot Unicode Braille characters to the six-dot subset by stripping the bottom pair of dots.

Live Translation

Figure 16A:
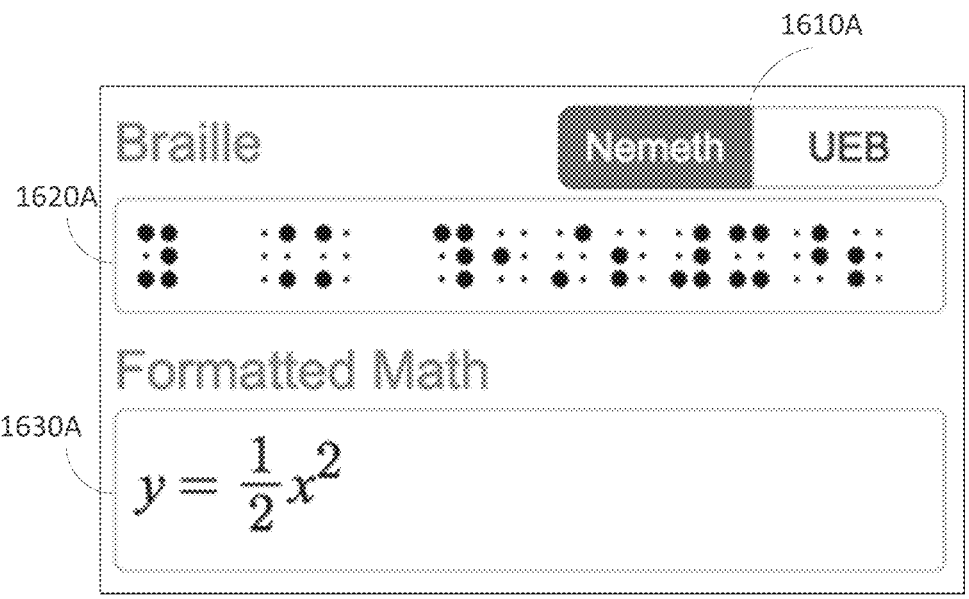
FIG. 16A illustrates an exemplary screenshot of an exemplary Braille translator according to an embodiment of the present invention.
Figure 16B:
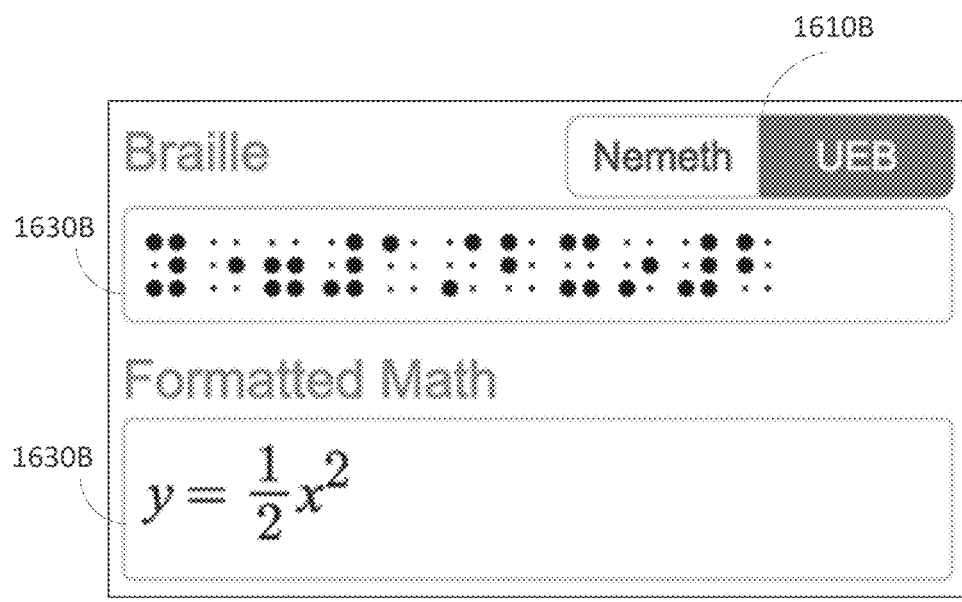
FIG. 16B illustrates another exemplary screenshot of the exemplary Braille translator shown in FIG. 16A.

Embodiments of the Braille translator disclosed in this specification include two example web pages demonstrating how to integrate it into a real-world web application: the first presents buttons to toggle between either Nemeth or UEB, an edit box which accepts Braille input, and a standard input field for entering a typeset mathematical expression, as shown in FIGS. 16A and 16B, with toggle buttons 1610A and 1610B, Braille input edit box 1620A and 1620B, and standard input field 1630A and 1630B. Typing into the Braille input field updates a typeset mathematical expression field (such as MathQuill), and entering data into the typeset mathematical expression field (such as MathQuill) updates the content of the Braille field.

Figure 16C:
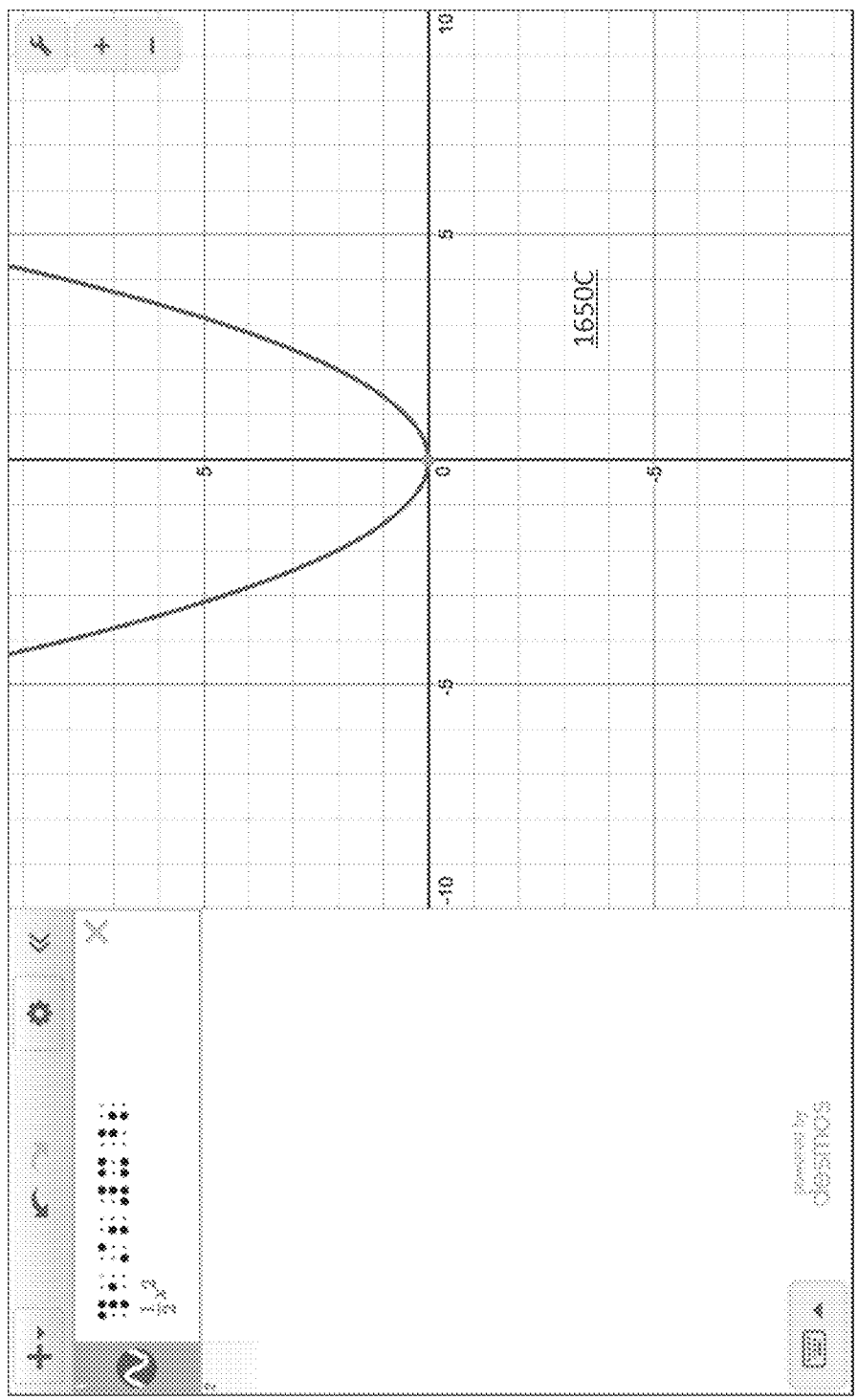
FIG. 16C illustrates an exemplary screenshot of an exemplary Braille translator with graphical representation according to an embodiment of the present invention.
Figure 16D:
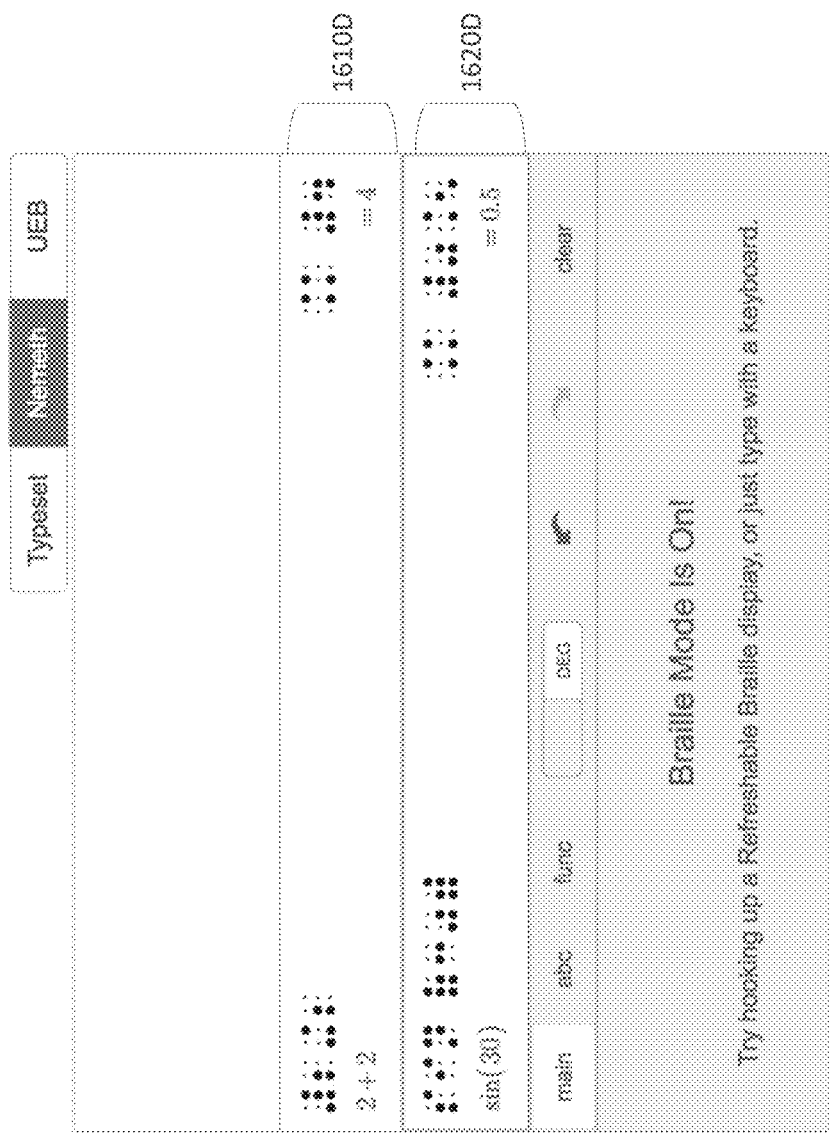
FIG. 16D illustrates an exemplary screenshot of an exemplary scientific calculator used in a browser or mobile app according to an embodiment of the present invention.

The second example takes the first example one step farther and in this embodiment of the invention, adds an instance of a browser or mobile app-based graphing calculator to the page as shown in FIG. 16C. Whenever there is an expression to evaluate in the typeset mathematical expression field (such as MathQuill), whether entered directly into the typeset mathematical expression field or into the Braille field, when this embodiment of the invention evaluates an expression, a graph representation (shown at 1650C) appears, where the graph representation may also be expressed in an audio format (not shown) in a similar fashion as discussed herein for other exemplary embodiments. FIG. 16D shows a screenshot of a browser or mobile app-based scientific calculator used in an embodiment of the present invention. Whenever there is an expression to evaluate in the typeset mathematical expression field (such as MathQuill), whether entered directly into the typeset mathematical expression field or into the Braille field, when this embodiment of the invention evaluates the expression, the scientific and graphing calculators show the numerical answer in Braille and in typeset math, as shown in lines 1610D and 1620D, where the mathematical expression and the answer may also be expressed in an audio format (not shown), such as a text-to-speech format. In addition to providing textual, Braille, and verbal representations of the evaluated mathematical expression, the graphing calculator displays a graph of mathematical expressions as shown in FIG. 16C.

Braille Normalization and Monitoring

After each keystroke entered in the Braille input field (referenced below as "elt"), the contents of the input box are normalized to Unicode Braille characters. Based on the mode flag, the normalized characters are then translated from either Nemeth or UEB to LaTeX. Finally, the translated LaTeX string is passed to the MathQuill input (referenced below as "mq") in the following code example:

```
// Using jQuery for brevity
var $input = $('#braille-input')
    .on('keyup change input', updateInput);
function updateInput ( ) {
    var unicodeInput =
Abraham.UnicodeBraille.coerceToSixDotCells($input.val( ));
    // Replace any non-unicode input with corresponding unicode dot
    // patterns. Maintaining selection and cursor position is simple
    // because this is a character-by-character transformation
    updateInputPreservingSelection($input[0], unicodeInput);
    var latex = MODE === 'nemeth' ?
        Abraham.nemethToLatex(unicodeInput).value :
        Abraham.uebToLatex(unicodeInput).value
    ;
    mq.latex(latex || '');
}
function updateInputPreservingSelection (inputElt, value) {
    if (inputElt.value === value) return;
    var selectionStart = inputElt.selectionStart;
    var selectionEnd = inputElt.selectionEnd;
    var selectionDirection = inputElt.selectionDirection;
    inputElt.value = value;
    inputElt.setSelectionRange(selectionStart, selectionEnd,
selectionDirection);
}
```

Mapping input to Unicode is useful to avoid confusion from interpreting Braille ASCII based on the ASCII symbols rather than the Braille cells they represent (e.g. a screen reader might read an open fraction symbol as "question mark").

Also note the technique for preserving the selection and cursor position when updating the value property of the input.

Typeset Mathematical Expression Monitoring

MathQuill's "edit" event listener is hooked to watch for changes to the field's LaTeX contents and to update the Braille input field accordingly as in the following code snippet:

```
function isMQFocused ( ) {
    return document.activeElement &&
    $(document.activeElement).closest('.mq-editable-field')[0];
}
var mq = MQ.MathField($('#mathquill')[0], {
    handlers: {
        edit: function (mq) {
            if (!isMQFocused( )) return;
            var translation = MODE === 'nemeth' ?
                Abraham.latexToNemeth(mq.latex( )).value :
                Abraham.latexToUeb(mq.latex( )).value
            ;
            $input.val(translation || '');
        }
    }
});
```

The above may be implemented into four-function and scientific calculator programs that employ the typeset mathematical expressions used in embodiments of the present invention, in addition to being integrated into the Internet-enabled audio-visual graphing calculator described here as embodiments of the claimed invention.

While the present invention has been particularly described with respect to the illustrated embodiments, it will be appreciated that various alterations, modifications and adaptations may be made based on the present disclosure and are intended to be within the scope of the present invention. While the invention has been described in connection with what are presently considered to be the most practical and preferred embodiments, it is to be understood that the present invention is not limited to the disclosed embodiment but, on the contrary, is intended to cover various modifications and equivalent arrangements included within the scope of the underlying principles of which are illustrated by the examples set forth herein.

What is claimed is:

1. A method for graphically representing mathematical expressions on a user device in an audiovisual format comprising:
    receiving input from the user device in at least one of audio, visual, or Braille formats;
    interpreting input from the user device as a typeset mathematical expression;
    parsing the typeset mathematical expression into an interpreted mathematical expression;
    compiling the interpreted mathematical expression into an evaluation function;
    sampling the evaluation function for at least one sampled point;
    rendering the sampled evaluation function for the sampled point as a graph on a visual display of at least one user device; and
    generating an audible representation of the rendered graph for playback on the user device.

2. The method of claim 1, wherein a browser program running on the user device receives input from the user device, displays the rendered graph and plays back the audible representation of the rendered graph.

3. The method of claim 1, wherein the audible representation of the rendered graph is generated through HTML5 waveform synthesis.

4. The method of claim 1, wherein the audible representation of the rendered graph comprises an audio trace mode.

5. The method of claim 4, wherein generating the audible representation comprises activating the audio trace mode.

6. The method of claim 5, wherein activating the audio trace mode comprises: retrieving a graph sketch for the mathematical expression; verifying the graph sketch; activating a tone generator; and retrieving at least one viewport bound.

7. The method of claim 5, wherein the activated audio trace mode provides audio feedback of at least one sampled point in response to a user selection of the sampled point.

8. The method of claim 7, wherein at least one sampled point comprises at least one of an origin of the rendered graph or a midpoint of a viewport.

9. The method of claim 5, wherein the activated audio trace mode comprises navigating through at least one sampled point to a second sampled point in response to a user input.

10. The method of claim 1, further comprising: computing the rendered graph to generate a modified rendered graph in response to a user modification of at least one factor of the mathematical expression.

11. The method of claim 1, further comprising: modifying the visual display and the audible representation of the rendered graph in response to a user modification of at least one factor of the mathematical expression.

12. The method of claim 1, wherein a user modification of at least one factor of the mathematical expression is performed via manual text entry or an adjustable slider interface.

13. The method of claim 1, wherein the audible representation of the rendered graph comprises an audible interpretation of a discontinuity in the mathematical expression.

14. The method of claim 1, wherein the audible representation of the rendered graph comprises indicating a quadrant location of a point on the rendered graph.

15. The method of claim 1, wherein the audible representation of the rendered graph comprises indicating a point of intersection on the rendered graph.

16. The method of claim 1, wherein the audible representation comprises a verbal graph summary including at least one location of a point of interest on the rendered graph.

17. The method of claim 1, wherein the user device comprises at least one of: a smart phone, a tablet computer, a laptop computer, or a desktop computer.

18. A computer program product comprising instructions stored in a non-transitory machine-readable medium, the instructions including instructions which when executed by a processor, cause the processor to perform:
    receiving input from a user device in one or more of audio, visual, or Braille formats;
    interpreting input from the user device as at least one typeset mathematical expression;
    parsing the at least one typeset mathematical expression into at least one interpreted mathematical expression;
    compiling the interpreted mathematical expression into an evaluation function;
    sampling the evaluation function for at least one point of interest or an error parameter;
    rendering the sampled evaluation function for the point of interest as a graph on a visual display of the user device; and
    generating an audible representation of the rendered graph; and playing the audible representation of the rendered graph on the user device upon receiving a request from a user.

19. The computer program product of claim 18, further comprising displaying at least one of the typeset mathematical expression and the evaluation function in a Braille format.

20. An Internet-enabled audio-visual graphing calculator comprising:
- an input interface configured to receive expression list input from a user device, wherein the expression list input comprises at least one expression item in at least one of audio, visual, or Braille formats;
- a math engine communicatively coupled to the input interface and configured to execute instructions, wherein the math engine upon execution of the instructions:
  - receives a mathematical expression item from the input interface as at least one typeset mathematical expression;
  - parses the at least one typeset mathematical expression into at least one interpreted mathematical expression;
  - compiles the interpreted mathematical expression into an evaluation function; and
  - samples the evaluation function for at least one sampled point or an error parameter;
- a grapher configured to render the sampled evaluation function for the sampled point as a graph on a visual display of the user device;
- a tone generator communicatively coupled to the math engine and configured to generate an audible representation of the rendered graph and play the audible representation of the rendered graph on the user device upon receiving a request from a user; and
- a communication interface coupled to the math engine and operable to communicatively couple with an external device and operable to send and receive data comprising at least one expression item to and from the external device.

21. The Internet-enabled audio-visual graphing calculator of claim 20, wherein the at least one expression item comprises a mathematical expression item, a table, an image, or a text box.

* * * * *